(12) United States Patent
Lee et al.

(10) Patent No.: US 10,922,100 B2
(45) Date of Patent: Feb. 16, 2021

(54) METHOD AND ELECTRONIC DEVICE FOR CONTROLLING DISPLAY

(71) Applicant: Samsung Electronics Co., Ltd., Gyeonggi-do (KR)

(72) Inventors: Jong-Moo Lee, Seoul (KR); Seung-Min Choi, Gyeonggi-do (KR); Hye-Soon Jeong, Gyeongsangbuk-do (KR); Ji-Woo Lee, Gyeongsangbuk-do (KR)

(73) Assignee: Samsung Electronics Co., Ltd

( * ) Notice: Subject to any disclaimer, the term of this patent is extended or adjusted under 35 U.S.C. 154(b) by 144 days.

(21) Appl. No.: 15/870,339

(22) Filed: Jan. 12, 2018

(65) Prior Publication Data

US 2018/0217854 A1   Aug. 2, 2018

(30) Foreign Application Priority Data

Jan. 31, 2017  (KR) .......................... 10-2017-0013833

(51) Int. Cl.
  *G06F 9/451*   (2018.01)
  *G06F 3/041*   (2006.01)
  (Continued)

(52) U.S. Cl.
  CPC .............. *G06F 9/451* (2018.02); *G06F 3/041* (2013.01); *G06F 3/0412* (2013.01);
  (Continued)

(58) Field of Classification Search
  CPC ........ G06F 9/451; G06F 3/041; G06F 3/0412; G06F 3/0482; G06F 3/04883;
  (Continued)

(56) References Cited

U.S. PATENT DOCUMENTS

| 7,852,352 B2 | 12/2010 | Sugiyama et al. |
| 8,130,206 B2 | 3/2012 | Lindroos |

(Continued)

FOREIGN PATENT DOCUMENTS

| CN | 105184228 | 12/2015 |
| EP | 2 871 872 | 5/2015 |

(Continued)

OTHER PUBLICATIONS

European Search Report dated Jun. 4, 2018 issued in counterpart application No. 18154373.7-1221, 12 pages.

(Continued)

*Primary Examiner* — Christopher E Leiby
(74) *Attorney, Agent, or Firm* — The Farrell Law Firm, P.C.

(57) ABSTRACT

An electronic device for processing a touch input is provided. The electronic device includes a touch screen display having a first aspect ratio; a memory that stores at least one application; and a processor electrically connected to the touch screen display and the memory, wherein the processor is configured to compare a second aspect ratio of a user interface of one of the at least one application with the first aspect ratio, display the user interface in a first area having the second aspect ratio of the touch screen display when the second aspect ratio is smaller than the first aspect ratio, display at least one function button, which is not a part of the application, in a second area of the touch screen display that does not overlap the first area, display the user interface in an entire area of the touch screen display when the second aspect ratio is equal to the first aspect ratio, and display the at least one function button on the touch screen display such that the function button overlaps the user interface.

20 Claims, 28 Drawing Sheets

(51) Int. Cl.
*G06F 3/0482* (2013.01)
*G06F 3/0488* (2013.01)
*G06K 9/00* (2006.01)
*H04N 7/01* (2006.01)

(52) U.S. Cl.
CPC ........ *G06F 3/0482* (2013.01); *G06F 3/04883* (2013.01); *G06F 3/04886* (2013.01); *G06K 9/0002* (2013.01); *H04N 7/0122* (2013.01); *G06F 2203/04105* (2013.01); *G06K 9/00006* (2013.01)

(58) Field of Classification Search
CPC ...... G06F 3/04886; G06F 2203/04105; G06K 9/0002; G06K 9/00006; H04N 7/0122
See application file for complete search history.

(56) References Cited

U.S. PATENT DOCUMENTS

| | | | |
|---|---|---|---|
| 9,032,292 B2* | 5/2015 | Lavallee | G06F 9/543 715/700 |
| 9,298,305 B2 | 3/2016 | Ishitsuka | |
| 2006/0062382 A1 | 3/2006 | Ronkainen | |
| 2007/0136685 A1* | 6/2007 | Bhatla | G09G 5/14 715/800 |
| 2009/0091578 A1 | 4/2009 | Carnahan et al. | |
| 2012/0050267 A1 | 3/2012 | Seo | |
| 2012/0144331 A1 | 6/2012 | Tolonen et al. | |
| 2013/0167073 A1* | 6/2013 | Ari | G06F 3/0481 715/798 |
| 2014/0028915 A1* | 1/2014 | Kim | H04N 21/4316 348/518 |
| 2014/0096053 A1 | 4/2014 | Lee et al. | |
| 2015/0054733 A1 | 2/2015 | Pedersen et al. | |
| 2015/0116593 A1* | 4/2015 | Hamish | H04N 7/0122 348/445 |
| 2015/0220215 A1* | 8/2015 | Choi | G06F 3/0481 715/800 |
| 2015/0261431 A1* | 9/2015 | Ohtsuka | G06F 3/04886 345/173 |
| 2015/0363632 A1 | 12/2015 | Ahn et al. | |
| 2015/0365306 A1* | 12/2015 | Chaudhri | G06F 3/0416 715/736 |
| 2015/0371073 A1* | 12/2015 | Cho | G06F 3/0488 382/124 |
| 2016/0042166 A1 | 2/2016 | Kang et al. | |
| 2016/0132132 A1 | 5/2016 | Li | |
| 2016/0196806 A1 | 7/2016 | Lee et al. | |
| 2016/0239250 A1 | 8/2016 | Kim et al. | |
| 2017/0046558 A1 | 2/2017 | Li et al. | |
| 2017/0220844 A1* | 8/2017 | Jones | G06K 9/0053 |
| 2017/0289324 A1* | 10/2017 | Yeo | G03B 29/00 |
| 2017/0336910 A1* | 11/2017 | Han | G06F 3/0416 |
| 2018/0121028 A1* | 5/2018 | Kuscher | G06F 3/04817 |
| 2018/0150163 A1* | 5/2018 | Lee | G06F 3/0416 |
| 2018/0151641 A1* | 5/2018 | Choo | H04M 1/0266 |
| 2018/0260803 A1* | 9/2018 | Seol | G06F 21/32 |
| 2019/0018555 A1* | 1/2019 | Jing | G06F 3/04817 |
| 2019/0050619 A1* | 2/2019 | Kern | G06K 9/0002 |

FOREIGN PATENT DOCUMENTS

| | | |
|---|---|---|
| KR | 1020120011254 | 2/2012 |
| KR | 10-2014-0039346 | 4/2014 |
| KR | 1020140043644 | 4/2014 |
| KR | 10-2015-0045205 | 4/2015 |
| KR | 10-2016-0085173 | 7/2016 |
| WO | WO 2015/140600 | 9/2015 |

OTHER PUBLICATIONS

International Search Report dated May 4, 2018 issued in counterpart application No. PCT/KR2018/001287, 7 pages.
European Search Report dated Oct. 19, 2020 issued in counterpart application No. 18154373.7-1203, 24 pages.

* cited by examiner

METHOD AND ELECTRONIC DEVICE FOR CONTROLLING DISPLAY

PRIORITY

This application claims priority under 35 U.S.C. § 119(a) to Korean Patent Application No. 10-2017-0013833 filed in the Korean Intellectual Property Office on Jan. 31, 2017, the content of which is incorporated herein by reference.

BACKGROUND

1. Field of the Disclosure

The present disclosure relates generally to an electronic device, and more particularly, to a method for controlling a display.

2. Description of the Related Art

In an electronic device, a display and a physical function button are separate from each other, and a display area and an area occupied by the physical function button for controlling a terminal are clearly distinguished from each other. Function buttons for controlling the terminal are not required to be displayed on the display, and, accordingly, an aspect ratio of the display may be the same as an aspect ratio of a user interface of an application. For example, when an application has a user interface with an aspect ratio of 16:9, the display having the same aspect ratio needs to only slightly control a scale but does not need to control the screen width or height.

The electronic device may have a fingerprint sensor within a physical function button for use as a fingerprint input device. The electronic device may display a fingerprint authentication user interface in the display area so that the user can recognize a fingerprint authentication progress step and a fingerprint recognition result after a fingerprint is input through the physical function button.

Since the electronic device, including the physical function button, should secure a predetermined area on the front surface of the electronic device as an area in which the function button is arranged, the aspect ratio of a display may be limited, and thus the aspect ratio of a user interface of an application provided on the display of the electronic device may also be limited.

On the other hand, the electronic device, including a function button in the form of a soft key, may provide an application through a user interface capable of having various aspect ratios. Accordingly, the electronic device is required to display a user interface having a suitable aspect ratio on the display together with function buttons having functions for controlling the electronic device based on a comparison between an aspect ratio of the touch screen display installed in the electronic device and an aspect ratio of the user interface.

SUMMARY

The present disclosure has been made to address at least the above problems and/or disadvantages and to provide at least the advantages described below.

According to an aspect of the present disclosure, an electronic device may determine an aspect ratio, on which an interface of an application is controlled through a display, based on an aspect ratio of the application stored in a memory of the electronic device.

In accordance with an aspect of the present disclosure, an electronic device is provided. The electronic device includes a housing including a first plate and a second plate facing a direction opposite the first plate; a touch screen display located between the first plate and the second plate, exposed through the first plate, and having a first aspect ratio; a wireless communication circuit located within the housing; at least one processor located within the housing and electrically connected to the display and the wireless communication circuit; and a memory located within the housing and electrically connected to the processor, wherein the memory is configured to store at least one application and further store instructions, and when executed, the instructions cause the processor to acquire a second aspect ratio of a user interface of the application, compare the second aspect ratio with the first aspect ratio, display the user interface in a first area of the touch screen display having a ratio substantially equal to the second aspect ratio when the second aspect ratio is smaller than the first aspect ratio, display at least one function button, which is not a part of the application, in a second area of the touch screen display that does not overlap the first area, display the user interface over substantially an entire area of the touch screen display when the second aspect ratio is substantially equal to the first aspect ratio, and display the at least one function button on the touch screen display such that the function button at least temporarily overlaps the user interface.

In accordance with another aspect of the present disclosure, a non-transitory computer-readable recording medium having a program recorded therein to be executed on a computer is provided. The program causes, when executed by a processor, the processor to compare a second aspect ratio of a user interface of an application executed by the processor with a first aspect ratio of a touch screen display, display the user interface in a first area of the touch screen display having a ratio substantially equal to the second aspect ratio when the second aspect ratio is smaller than the first aspect ratio, display at least one function button, which is not a part of the application, in a second area of the touch screen display that does not overlap the first area, display the user interface over substantially an entire area of the touch screen display when the second aspect ratio is substantially equal to the first aspect ratio, and display the at least one function button on the touch screen display such that the function button at least temporarily overlaps the user interface.

In accordance with another aspect of the present disclosure, an electronic device is provided. The electronic device includes a touch screen display having a first aspect ratio; a memory that stores at least one application; and a processor electrically connected to the touch screen display and the memory, wherein the processor compares a second aspect ratio of a user interface of one of at least one application with the first aspect ratio, displays the user interface in a first area having the second aspect ratio of the touch screen display when the second aspect ratio is lower than the first aspect ratio, displays at least one function button, which is not a part of the application, in a second area of the touch screen display that does not overlap the first area, displays the user interface over an entire area of the touch screen display when the second aspect ratio is equal to the first aspect ratio, and displays the at least one function button on the touch screen display such that the function button overlaps the user interface.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
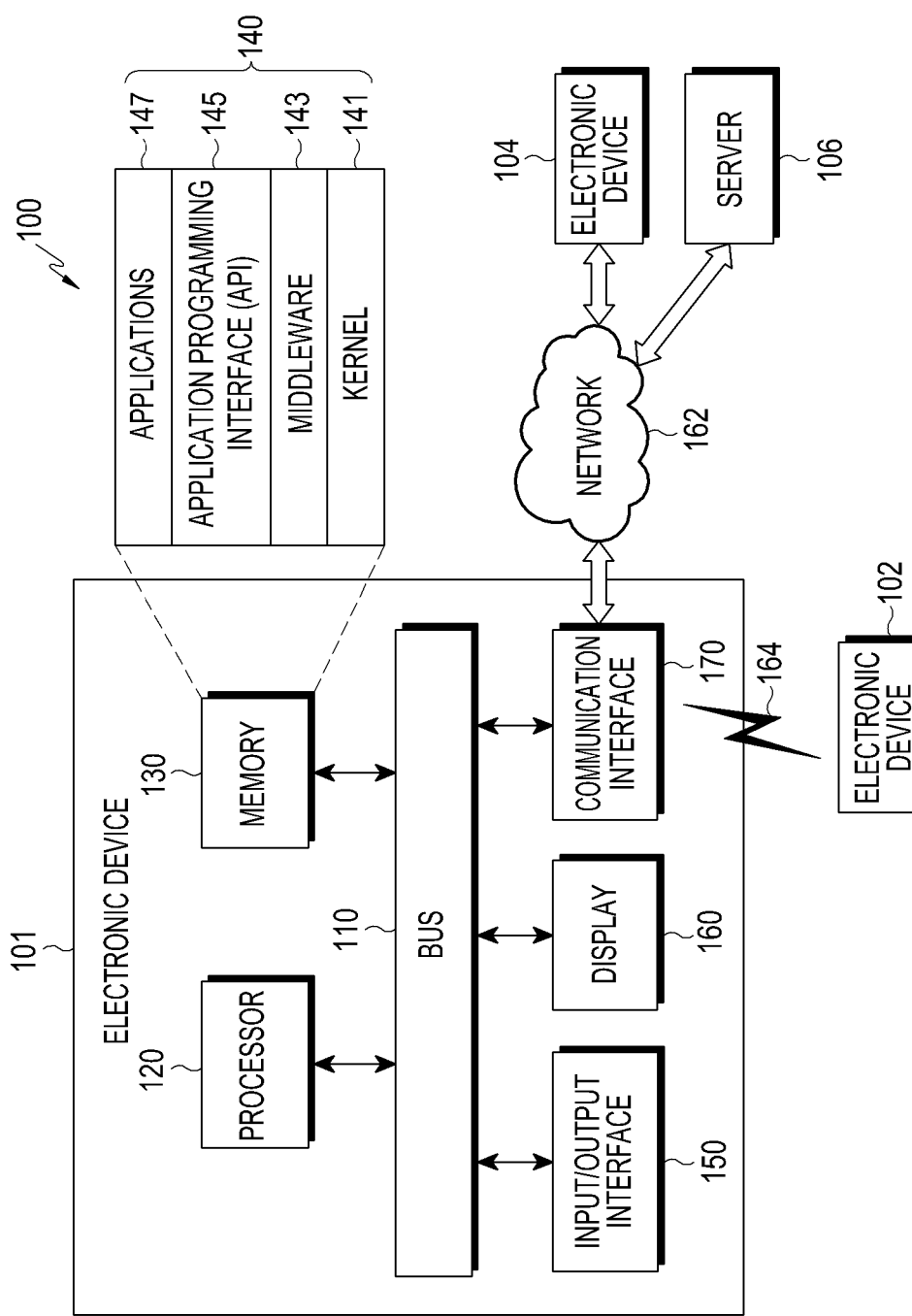
FIG. 1 illustrates a network environment including an electronic device, according to an embodiment of the present disclosure.

Embodiments of the present disclosure will be described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

A singular expression may include a plural expression unless the context dictates otherwise. The expressions "a first", "a second", "the first", or "the second" may modify various components regardless of the order and/or the importance but do not limit the corresponding components. When an element (e.g., a first element) is referred to as being "(functionally or communicatively) connected," or "directly coupled" to another element (e.g., a second element), the element may be connected directly to the another element or connected to the another element through yet another element (e.g., a third element).

The expression "configured to" may be interchangeably used with "suitable for", "having the capacity to", "designed to", "adapted to", "made to", or "capable of", according to circumstances. Alternatively, in some situations, the expression "device configured to" may mean that the device, together with other devices or components, "is able to". For example, the phrase "processor adapted (or configured) to perform A, B, and C" may mean that a dedicated processor (e.g., an embedded processor) only for performing the corresponding operations or a generic-purpose processor (e.g., a central processing unit (CPU) or application processor (AP)) can perform the corresponding operations by executing one or more software programs stored in a memory device.

An electronic device, according to various embodiments of the present disclosure, may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, glasses, contact lenses, or a head-mounted device (HMD)), a fabric or clothes integrated device (e.g., electronic clothing), a body-mounted device (e.g., a skin pad, or tattoo), and a bio-implantable device (e.g., an implantable circuit). The electronic device may include at least one of a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, or a body temperature measuring device), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), an avionics device, a security device, an automotive head unit, a robot for home or industry, an automatic teller machine (ATM), a point of sales (POS) device, or Internet of things (IoT) device (e.g., a light bulb, various sensors, an electric or gas meter, a sprinkler device, a fire alarm, a thermostat, a streetlamp, a toaster, a sporting goods, a hot water tank, a heater, and a boiler).

An electronic device may include at least one of a part of furniture or a building/structure, an electronic board, an electronic signature receiving device, a projector, and various types of measuring instruments (e.g., a water meter, an electric or gas meter, or a radio wave meter). The electronic device may be flexible, or may be a combination of one or more of the aforementioned various devices. The electronic device is not limited to the above described devices. In the present disclosure, the term "user" may indicate a person using an electronic device or a device (e.g., an artificial intelligence electronic device) using an electronic device.

An electronic device 101 within a network environment 100 is described with reference to FIG. 1 The electronic device 101 includes a bus 110, a processor 120, a memory 130, an input/output interface 150, a display 160 (i.e., a touch screen display), and a communication interface 170. The electronic device 101 may omit at least one of the elements, or may further include other elements. The bus 110 may include a circuit that interconnects the elements 110 to 170 and transmits communication (i.e., control messages or data) between the elements. The processor 120 may include one or more of a cpu, an ap, and a communication processor (CP). The processor 120, for example, may carry out operations or data processing relating to the control and/or communication of at least one other element of the electronic device 101.

The memory 130 may include a volatile and/or non-volatile memory. The memory 130 may store instructions or data relevant to at least one other element of the electronic device 101. The memory 130 may store software and/or a program 140. The program 140 may includes a kernel 141, middleware 143, an application programming interface (API) 145, and/or applications (or "apps") 147. At least some of the kernel 141, the middleware 143, and the API 145 may be referred to as an operating system. The kernel 141 may control or manage system resources (i.e., the bus 110, the processor 120, or the memory 130) used for executing an operation or function implemented by other programs (i.e., the middleware 143, the API 145, or the applications 147). Furthermore, the kernel 141 may provide an interface through which the middleware 143, the API 145, or the applications 147 may access the individual elements of the electronic device 101 to control or manage the system resources.

The middleware 143 may function as an intermediary for allowing the API 145 or the applications 147 to communicate with the kernel 141 to exchange data. In addition, the middleware 143 may process one or more task requests received from the applications 147 according to priorities thereof. For example, the middleware 143 may assign priorities for using the system resources (i.e., the bus 110, the processor 120, or the memory 130) of the electronic device 101 to one or more of the applications 147, and may process the one or more task requests. The API 145 is an interface used by the applications 147 to control a function provided from the kernel 141 or the middleware 143, and may include at least one interface or function (i.e., an instruction) for file control, window control, image processing, or character control. The input/output interface 150 may forward instructions or data, input from a user or an external device, to the other element(s) of the electronic device 101, or may output instructions or data, received from the other element(s) of the electronic device 101, to the user or the external device.

The display 160 (i.e., a touch screen display) may include a liquid crystal display (LCD), a light-emitting diode (LED) display, an organic light-emitting diode (OLED) display, a micro electro mechanical system (MEMS) display, or an electronic paper display. The display 160 may display various types of content (e.g., text, images, videos, icons, and/or symbols) for a user. The display 160 may include a touch screen and may receive a touch, gesture, proximity, or hovering input using an electronic pen or a part of a user's body. The communication interface 170 may configure communication between the electronic device 101 and an external device (i.e., a first external electronic device 102, a second external electronic device 104, or a server 106). For example, the communication interface 170 may be connected to a network 162 through wireless or wired communication to communicate with the external device (i.e., the second external electronic device 104 or the server 106).

The wireless communication may include cellular communication that uses at least one of LTE, LTE-Advanced (LTE-A), code division multiple access (CDMA), wideband CDMA (WCDMA), universal mobile telecommunications system (UMTS), wireless broadband (WiBro), or global system for mobile communications (GSM). The wireless communication may include at least one of Wi-Fi, Bluetooth, Bluetooth low energy (BLE), zigbee, near field communication (NFC), magnetic secure transmission, radio frequency (RF), and body area network (BAN). The wired communication may include global navigational satellite systems (GNSS), such as a global positioning system (GPS), a global navigation satellite system (GLONASS), a beidou navigation satellite system (BeiDou), or Galileo (the European global satellite-based navigation system). Hereinafter, in this document, the term "GPS" may be interchangeable with the term "GNSS".

The wired communication may include at least one of a universal serial bus (USB), a high definition multimedia interface (HDMI), recommended standard 232 (RS-232), and a plain old telephone service (POTS). The network 162 may include a telecommunications network at least one of a computer network (i.e., a LAN or a WAN), the Internet, and a telephone network.

Each of the first and second external electronic devices 102 and 104 may be identical to or different from that of the electronic device 101. All or some of the operations executed in the electronic device 101 may be executed in another electronic device or a plurality of electronic devices (i.e., the electronic devices 102 and 104 or the server 106). When the electronic device 101 has to perform some functions or services automatically or in response to a request, the electronic device 101 may make a request for performing at least some functions relating to the functions or services to another device instead of, or in addition to, performing the functions or services by itself. Another electronic device may execute the requested functions or the additional functions, and may deliver) information about the result of execution to the electronic device 101. The electronic device 101 may process the received result as it is, or may provide the requested function or service after additional processing. To this end, cloud-computing technology, distributed-computing technology, or client-server computing technology may be used.

According to various embodiments of the present disclosure, an electronic device may include a housing including a first plate and a second plate facing a direction opposite the first plate; a touch screen display located between the first plate and the second plate, exposed through the first plate, and having a first aspect ratio; a wireless communication circuit located within the housing; at least one processor located within the housing and electrically connected to the display and the wireless communication circuit; and a memory located within the housing and electrically connected to the processor, wherein the memory may be configured to store at least one application and further store instructions, and, when executed, the instructions may cause the processor to acquire a second aspect ratio of a user interface of the application, compare the second aspect ratio with the first aspect ratio, display the user interface in a first area of the touch screen display having a ratio substantially equal to the second aspect ratio when the second aspect ratio is smaller than the first aspect ratio, display at least one function button, which is not a part of the application, in a second area of the touch screen display that does not overlap the first area, display the user interface over substantially an entire area of the touch screen display when the second aspect ratio is substantially equal to the first aspect ratio, and display the at least one function button on the touch screen display such that the function button at least temporarily overlaps the user interface.

The at least one function button may include a home button, a button for returning to a previously displayed screen, and/or a button for displaying at least one recently executed application.

The touch screen display may include a first side extending in a first direction and having a first length X, a second side extending in a second direction perpendicular to the first direction and having a second length Y shorter than the first length, a third side having the first length and extending parallel to the first side, and a fourth side having the second length and parallel to the second side, and a first aspect ratio may correspond to X:Y, which is larger than 16:9. The first aspect ratio X:Y may be within a range from 21:9 to 17:9. The first area may include a first edge extending in the first direction and having a length Z shorter than X and a second edge extending in the second direction and having a length substantially equal to Y. The second area may include a third edge extending in the first direction and having a length equal to the difference between X and Z (X−Z) and a fourth edge extending in the second direction and having a length substantially equal to Y. The first area may be adjacent to the second side of the display and the second area may be adjacent to the fourth side of the display.

The electronic device may further include a fingerprint recognition sensor between the first plate and the second plate, wherein the fingerprint recognition sensor may be located in the second area of the touch screen display when viewed from on top of the first plate. Instructions may cause the processor to at least temporarily display a graphic user interface (GUI) on the display, and the GUI may show the location of the fingerprint recognition sensor. The GUI may be integrated with the at least one function button. The instructions may cause the processor to display the GUI in the second area of the touch screen display when the second aspect ratio is smaller than the first aspect ratio, and display the GUI on the touch screen display such that the GUI at least temporarily overlaps the user interface when the second aspect ratio is substantially equal to the first aspect ratio. The second aspect ratio may be 16:9.

Figure 2:
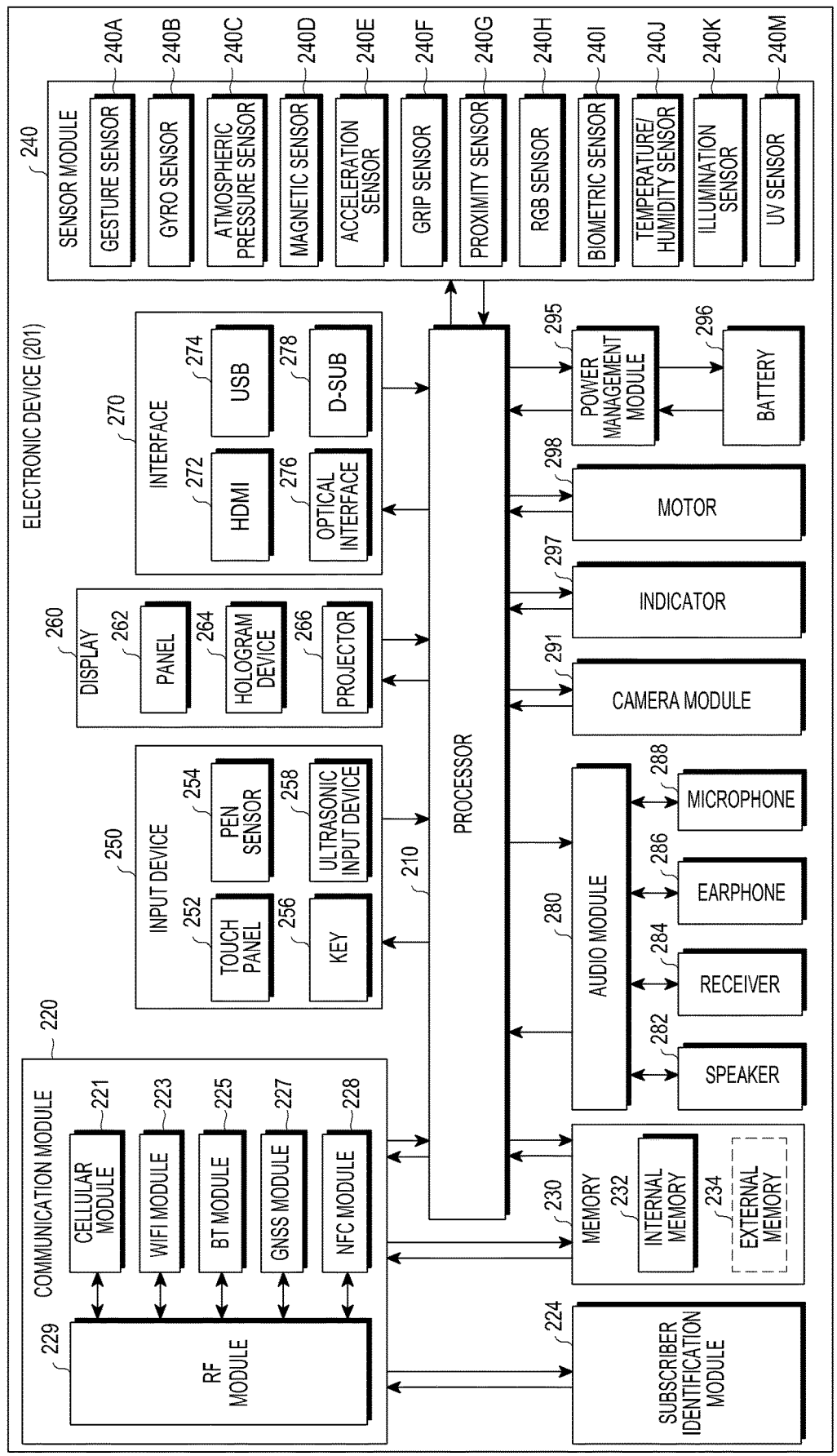
FIG. 2 is a block diagram of an electronic device, according to an embodiment of the present disclosure.

FIG. 2 is a block diagram of an electronic device 201, according to an embodiment of the present disclosure. The electronic device 201 may include all or part of the electronic device 101 illustrated in FIG. 1. The electronic device 201 includes at least one processor 210 (i.e., an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application. The processor 210A may be implemented by a system on chip (SoC). The processor 210 may further include a graphic processing unit (GPU) and/or an image signal processor (ISP). The processor 210 may also include at least some of the elements (i.e., a cellular module 221) illustrated in FIG. 2. The processor 210 may load, in volatile memory, instructions or data received from at least one of the other elements (i.e., non-volatile memory), process the loaded instructions or data, and store the resultant data in the non-volatile memory.

The communication module 220 may have a configuration that is the same as, or similar to, that of the communication interface 170. The communication module 220 includes the cellular module 221, a Wi-Fi module 223, a Bluetooth module 225, a GNSS module 227, an NFC module 228, and an RF module 229. The cellular module 221 may provide a voice call, a video call, a text message service, or an Internet service, through a communication network. The cellular module 221 may identify and authenticate the electronic device 201 within a communication network using the subscriber identification module 224 (i.e., a SIM card). The cellular module 221 may perform at least some of the functions that the processor 210 may provide and may include a CP. At least some of the cellular module 221, the Wi-Fi module 223, the BT module 225, the GNSS module 227, and the NFC module 228 may be included in one integrated chip (IC) or IC package. The RF module 229 may transmit/receive a communication signal (i.e., an RF signal). The RF module 229 may include a transceiver, a power amp module (PAM), a frequency filter, a low noise amplifier (LNA), or an antenna. At least one of the cellular module 221, the Wi-Fi module 223, the BT module 225, the GPS module 227, and the NFC module 228 may transmit/receive an RF signal through a separate RF module. The subscriber identification module 224 may include a card that includes a subscriber identification module or an embedded SIM, and may contain unique identification information (i.e., an integrated circuit card identifier (ICCID)) or subscriber information (i.e., an international mobile subscriber identity (IMSI)).

The memory 230 (i.e., the memory 130) includes an internal memory 232 or an external memory 234. The internal memory 232 may include, for example, at least one of a volatile memory (i.e., a DRAM, an SRAM, or an SDRAM) and a non-volatile memory (i.e., a one-time programmable ROM (OTPROM), a PROM, an EPROM, an EEPROM, a mask ROM, a flash ROM, a flash memory, a hard disk drive, or a solid state drive (SSD)). The external memory 234 may include a flash drive, a compact flash (CF), a secure digital (SD), a micro-SD, a mini-SD, an eXtreme digital (xD), a multi-media card (MMC), and a memory stick. The external memory 234 may be functionally and/or physically connected to the electronic device 201 through any of various interfaces.

The sensor module 240 may measure a physical quantity or detect the operating state of the electronic device 201, and may convert the measured or detected information into an electrical signal. The sensor module 240 includes at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor (i.e., a red, green, and blue (RGB) sensor) 240H, a biometric sensor 240I, a temperature/humidity sensor 240J, an illumination sensor 240K, and an ultraviolet (UV) sensor 240M. Additionally or alternatively, the sensor module 240 may include an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. The electronic device 201 may further include a processor configured to control the sensor module 240, as a part of the processor 210 or separately from the processor 210 in order to control the sensor module 240 while the processor 210 is in a sleep state.

The input device 250 includes a touch panel 252, a (digital) pen sensor 254, a key 256, or an ultrasonic input device 258. The touch panel 252 may be at least one of a capacitive type, a resistive type, an infrared type, and an ultrasonic type. The touch panel 252 may further include a control circuit. The touch panel 252 may further include a tactile layer to provide a tactile reaction to a user. The (digital) pen sensor 254 may include a recognition sheet that is a part of, or separate from, the touch panel. The key 256 may include a physical button, an optical key, or a keypad. The ultrasonic input device 258 may detect ultrasonic waves generated by an input tool, through a microphone 288 and identify data corresponding to the detected ultrasonic waves.

The display 260 (i.e., the display 160) includes a panel 262, a hologram device 264, a projector 266, and/or a control circuit for controlling the same. The panel 262 may be flexible, transparent, or wearable. The panel 262, together with the touch panel 252, may be configured as one or more modules. The panel 262 may include a pressure sensor (i.e., a POS sensor) which may measure the strength of pressure of a user's touch. The pressure sensor may be integrated with the touch panel 252, or may be one or more sensors separate from the touch panel 252. The hologram device 264 may show a three-dimensional image in the air using light interference. The projector 266 may display an image by projecting light onto a screen located, for example, in the interior of, or on the exterior of, the electronic device 201. The interface 270 includes an HDMI 272, a USB 274, an optical interface 276, or a D-subminiature (D-sub) interface 278. The interface 270 may be included in the communication interface 170 illustrated in FIG. 1. Additionally or alternatively, the interface 270 may include a mobile high-definition link (MHL) interface, a SD card/MMC interface, or an Infrared Data Association (IrDA) standard interface.

The audio module 280 may convert sound into an electrical signal, and vice versa. At least some elements of the audio module 280 may be included in the input/output interface 145 illustrated in FIG. 1. The audio module 280 may process sound information that is input or output through a speaker 282, a receiver 284, earphones 286, and the microphone 288. The camera module 291 is a device that can photograph a still image and a moving image. The camera module 291 may include one or more image sensors (i.e., a front sensor or a rear sensor), a lens, an ISP, or a flash (i.e., an LED or xenon lamp). The power management module 295 may manage the power of the electronic device 201. The power management module 295 may include a power management integrated circuit (PMIC), a charger IC, or a battery gauge. The PMIC may use a wired and/or wireless charging method. The wireless charging method may include a magnetic resonance method, a magnetic induction method, and an electromagnetic wave method. Additional circuits (i.e., a coil loop, a resonance circuit, and a rectifier) for wireless charging may be further included. The battery gauge may measure, for example, a remaining charge, a voltage, a current, or a temperature while charging. The battery 296 may include a rechargeable battery and/or a solar battery.

The indicator 297 may display a particular state, such as a booting state, a message state, or a charging state of the electronic device 201 or a part (i.e., the processor 210) of the electronic device 201. The motor 298 may convert an electrical signal into a mechanical vibration and generate a vibration, or a haptic effect. The electronic device 201 may include a mobile TV support device (i.e., a GPU) that can process media data according to a standard such as digital multimedia broadcasting (DMB), digital video broadcasting (DVB), and MediaFlo™.

Each of the above-described component elements of hardware may be configured with one or more components, and the names of the corresponding component elements may vary depending on the type of electronic device. An electronic device (i.e., the electronic device 201) may omit some elements or may further include additional elements, or some of the elements of the electronic device may be combined with each other to configure a single entity, in which case the electronic device may identically perform the functions of the corresponding elements prior to the combination thereof.

Figure 3:
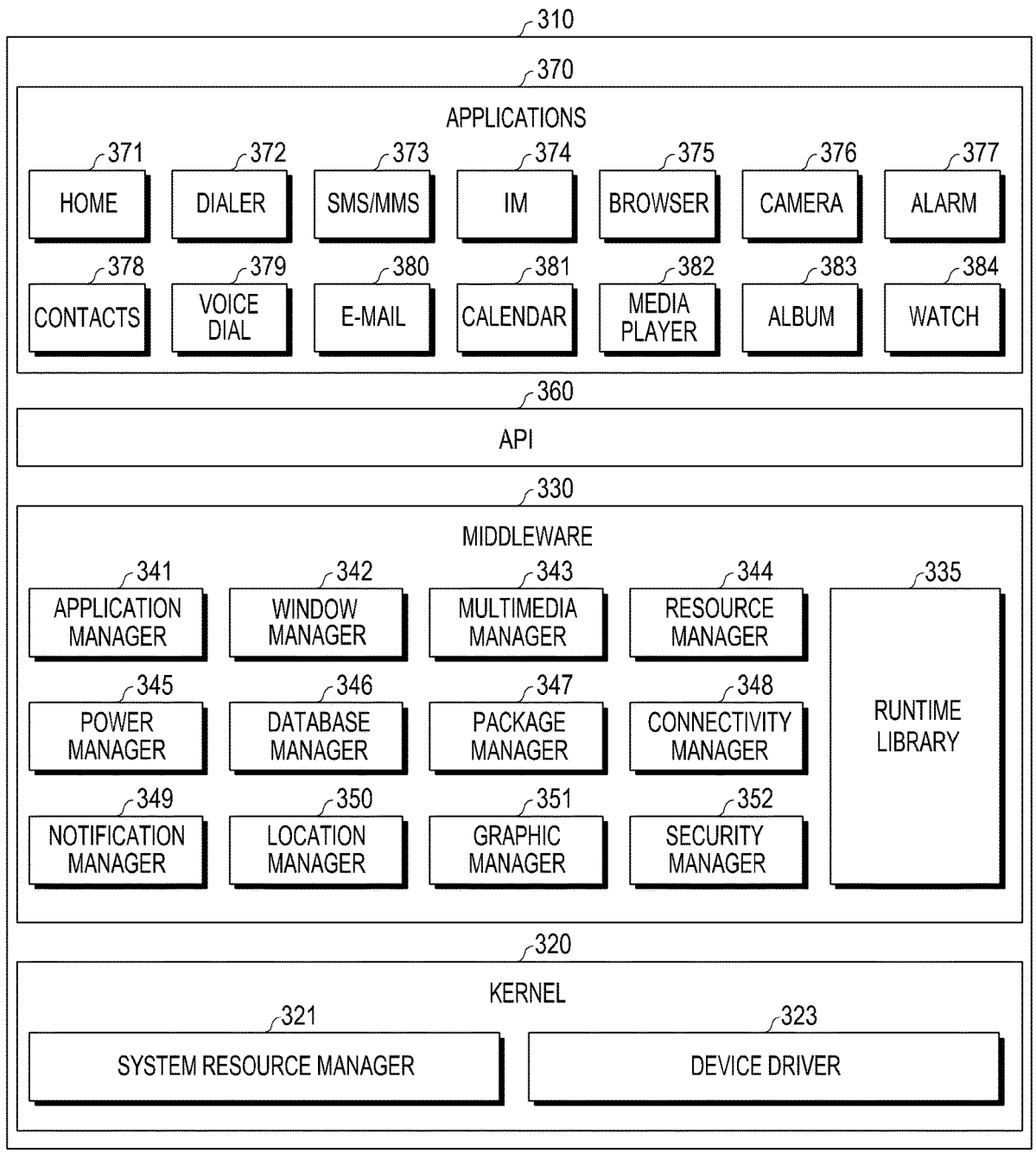
FIG. 3 is a block diagram of a program module, according to an embodiment of the present disclosure.

FIG. 3 is a block diagram of a program module, according to an embodiment of the present disclosure. The program module 310 may include an operating system (OS) that controls resources relating to an electronic device 101 and/or various applications 147 that are driven on the OS. The OS may include, for example, Android™, iOS™, Windows™, Symbian™, Tizen™, or Bada™.

Referring to FIG. 3, the program module 310 includes a kernel 320, middleware 330, an API 360, and/or applications 370. At least a part of the program module 310 may be preloaded on the electronic device, or may be downloaded from an external electronic device 102 or 104 or the server 106.

The kernel 320 includes a system resource manager 321 and/or a device driver 323. The system resource manager 321 may control, allocate, or retrieve system resources. The system resource manager 321 may include a process manager, a memory manager, or a file-system manager. The device driver 323 may include a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use the limited system resources within the electronic device. The middleware 330 includes at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may manage input/output, manage a memory, or process arithmetic functions. The application manager 341 may manage the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or space in memory. The power manager 345 may manage the capacity or power of a battery, and may provide power information required for operating the electronic device. The power manager 345 may operate in conjunction with a basic input/output system (BIOS). The database manager 346 may generate, search, or change databases to be used by the applications 370. The package manager 347 may manage the installation or update of an application that is distributed in the form of a package file.

The connectivity manager 348 may manage a wireless connection. The notification manager 349 may provide information on an event (i.e., an arrival message, an appointment, or a proximity notification) to a user. The location manager 350 may manage the location information of the electronic device. The graphic manager 351 may manage a graphic effect to be provided to a user and a user interface relating to the graphic effect. The security manager 352 may provide system security or user authentication. The middleware 330 may include a telephony manager for managing a voice or video call function of the electronic device or a middleware module that is capable of forming a combination of the functions of the above-described elements. The middleware 330 may provide specialized modules specific to the particular operating system and may dynamically remove some of the existing elements, or add new elements. The API 360 is a set of API programming functions, and may be provided with different configurations depending on the operating system. In the case of Android™ or iOS™, one API set may be provided for each platform, and in the case of Tizen™, two or more API sets may be provided for each platform.

The applications 370 includes a home application 371, a dialer application 372, an SMS/MMS application 373, an instant messaging (IM) application 374, a browser application 375, a camera application 376, an alarm application 377, a contact application 378, a voice dial application 379, an email application 380, a calendar application 381, a media player application 382, an album application 383, a watch application 384, a health-care application (i.e., for measuring exercise quantity or blood glucose level), or an application providing environmental information (i.e., atmospheric pressure, humidity, or temperature information). The applications 370 may include an information exchange application that can support the exchange of information between the electronic device and an external electronic device, and includes, for example, a notification relay application for relaying particular information to an external electronic device or a device management application for managing an external electronic device. The notification relay application may relay notification information generated in the other applications of the electronic device to an external electronic device, or may receive notification information from an external electronic device and provide the received notification information to a user. The device management application may install, delete, or update the functions (i.e., turning on/off the external electronic device itself (or some elements thereof) or adjusting the brightness (or resolution) of a display) of an external electronic device that communicates with the electronic device or applications executed in the external electronic device. The applications 370 may include applications (i.e., a health care application of a mobile medical appliance) that are designated according to the attributes of an external electronic device. The applications 370 may include applications received from an external electronic device. At least some of the program module 310 may be implemented (i.e., executed) by software, firmware, hardware (i.e., the processor 210), or a combination thereof, and may include a module, a program, a routine, an instruction set, or a process for performing one or more functions.

Figure 4A:
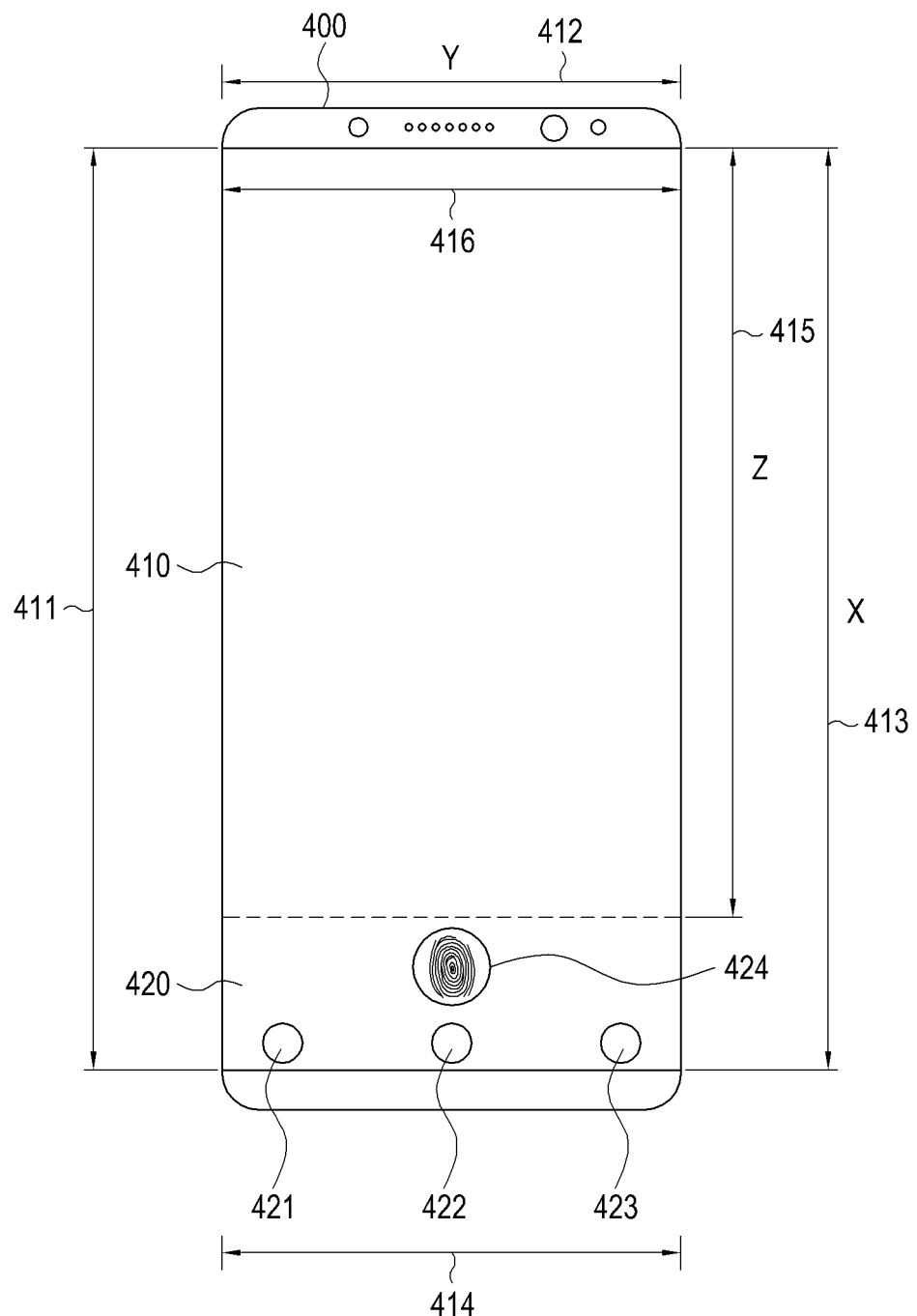
FIGS. 4A and 4B illustrate examples of a display having divided areas, according to an embodiment of the present disclosure.
Figure 4B:
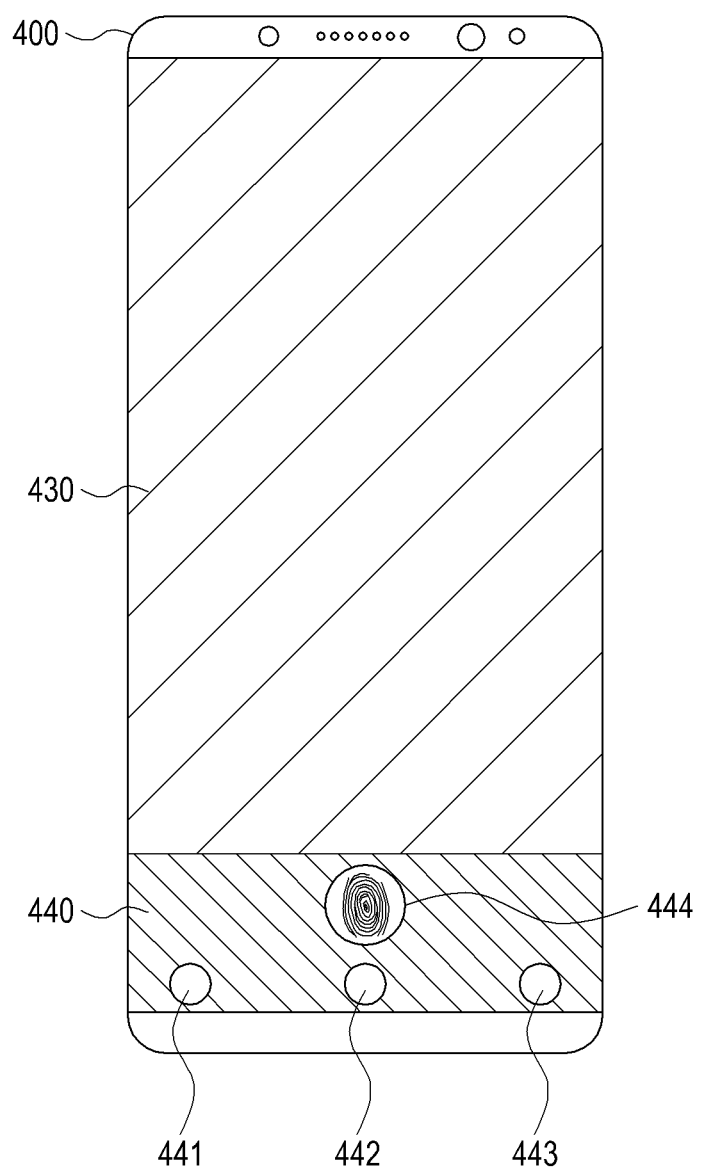

FIGS. 4A and 4B illustrate examples of a display having divided areas, according an embodiment of the present disclosure.

An electronic device 400, according to an embodiment of the present disclosure, includes the touch screen display 260 for displaying an interface of an application when the application stored in the memory 220 is executed by the processor 210. The user interface of the application may have various aspect ratios. For example, the user interface may have an aspect ratio (i.e., 16:9) of the application or an aspect ratio (i.e., 18.5:9) which is the same as that of the touch screen display. The touch screen display may have a different aspect ratio (i.e., 18.5:9) than the application (i.e., 16:9 or 21:9), in terms of the width or height thereof.

The processor 120 may display a user interface of the application having the aspect ratio of 16:9 in a partial area of the touch screen display and display a function button having a separate function for controlling the electronic device and a fingerprint input button in the remaining areas of the touch screen display. Alternatively, when the user interface has an aspect ratio of 18.5:9, which is the same as that of the touch screen display, the processor 120 may display the user interface in the entire area of the touch screen display. That is, the processor 120 may compare a first aspect ratio of the touch screen display (i.e., 18.5:9) and a second aspect ratio of the application (i.e., 16:9, 18.5:9, or 21:9), and display the user interface of the application on the touch screen display depending on the result of the comparison.

Referring to FIG. 4A, the touch screen display of the electronic device 400 includes a first side 411 that extends in a first direction and has a first length X, a second side 412 that extends in a second direction perpendicular to the first direction and has a second length Y that is shorter than the first length X, a third side 413 that has the first length and is parallel to the first side, and a fourth side 414 that has the second length and is parallel to the second side.

The first aspect ratio is denoted as X:Y (i.e., the first length:the second length). As described above, the first aspect ratio may be larger than 16:9, and may include a ratio of 18.5:9 within a range from 21:9 to 17:9. The touch screen display may have a resolution of 1440*2960 and may have an aspect ratio of 18.5:9, which is the ratio of the width to the height thereof. The first area may have a first edge 415 that extends in the first direction and has a length Z that is shorter than X, and a second edge 416 that extends in the second direction and has the length Y. The second edge 416 may be the same as the second side 412 of the touch screen display and have the same length as the fourth side 414.

FIG. 4A illustrates the case in which the first aspect ratio and the second aspect ratio are substantially the same as each other, based on a comparison between the first aspect ratio and the second aspect ratio by the processor 120. The term "substantially the same as each other" defined in the present disclosure may include not only the case in which the ratios are the same as each other but also the case in which the ratios are almost the same as each other with little difference because the difference is less than or equal to a threshold value. In this case, the processor 120 may display the user interface of the application in entire areas of the touch screen display (i.e., over a first area 410 and a second area 420).

Further, the processor may display some of the user interface and at least one function button 421, 422, and 423 in the second area 420 of the touch screen display, and the at least one function button 421, 422, and 423 may include a button 421 for showing a recently executed application, a home button 422, a cancel button 423, and a fingerprint recognition button 424.

The processor may set the first area 410 and the second area 420 including the entire areas of the display as a first layer and set a control area belonging to the second area 420 and including the at least one function button 421, 422, and 423, and the fingerprint recognition button 424 as a second layer. The second layer may exist on the first layer and may be displayed on the touch screen display to at least temporarily overlap the first layer, and some areas of the user interface displayed on the first layer may be completely hidden by the second layer, or may be partially hidden by the translucently displayed second layer.

FIG. 4B illustrates the case in which the first aspect ratio is larger than the second aspect ratio based on a comparison between the first aspect ratio and the second aspect ratio by the processor 120. As described above, some applications executed by the electronic device may provide an aspect ratio different from that of the touch screen display. For example, a web browser application may provide a screen that requires a scroll operation, and a game application may provide an aspect ratio of 16:9 that is optimized for game operation. Alternatively, a video application may provide an aspect ratio of 16:9 or 21:9, based on various viewing environments.

When the user interface of the application having the second aspect ratio of 16:9 is displayed on the display having the first aspect ratio of 18.5:9, the user interface of the application may be displayed at the second aspect ratio 16:9 for users unaccustomed to the first aspect ratio 18.5:9.

Referring to FIG. 4B, the processor 120 may display the user interface of the application having the second aspect ratio (i.e., 16:9 or 21:9) in a first area 430 and display a control area including function buttons 441, 442, and 443 for controlling the electronic device and a fingerprint recognition button 444 in a second area 440. The second area 440 may include a partially translucently displayed area.

The processor 120 may compare the first aspect ratio and the second aspect ratio and allocate the user interface and the control area to the first layer and the second layer depending on a result of the comparison. For example, the first layer may be set to include both the first area 410 and the second area 420 and the second layer may be allocated to the second area 420 and displayed on the first layer in FIG. 4A, and the first layer may be allocated to the first area 430 and the second layer may be allocated to the second area 440 in FIG. 4B. The display type of FIG. 4A may be referred to as a "floating type" and the display type of FIG. 4B may be referred to as a "split type".

When executing the application based on the aspect ratio, the processor 120 may determine the type of FIG. 4A and the type of FIG. 4B for providing a soft key corresponding to a function button for controlling the electronic device and a fingerprint input button. The processor 120 may then display the soft key and the fingerprint input button along with the user interface.

Table 1 below recites aspect ratios of the touch screen display and the application when displaying the user interface.

TABLE 1

| First aspect ratio value | Second aspect ratio value | Display resolution (based on vertical view) | User interface resolution (based on vertical view) | Interface display mode |
|---|---|---|---|---|
| 18.5:9 | 16:9 | 1440 × 2960 | 1440 × 2560 | Split mode |
| 18.5:9 | 4:3 | 1440 × 2960 | 1440 × 1920 | Split mode |
| 18.5:9 | 21:9 | 1440 × 2960 | 1268 × 2960 | Floating mode |
| 18.5:9 | A:9 | 1440 × 2960 | 1440 × B (B > 2960) | Floating mode |

The information provided in Table 1 is a result of a comparison between a first aspect ratio value of the touch screen display and a second aspect ratio value of the user interface of the application and a division of display modes of the user interface according to the comparison result. The resolution of an area (i.e., first layer) in which the application is displayed is different for the split mode and the floating mode. The vertical resolution of the user interface may be reduced in the split mode and the horizontal resolution of the user interface may be reduced in the floating mode with respect to the resolution of the touch screen display.

Figure 5A:
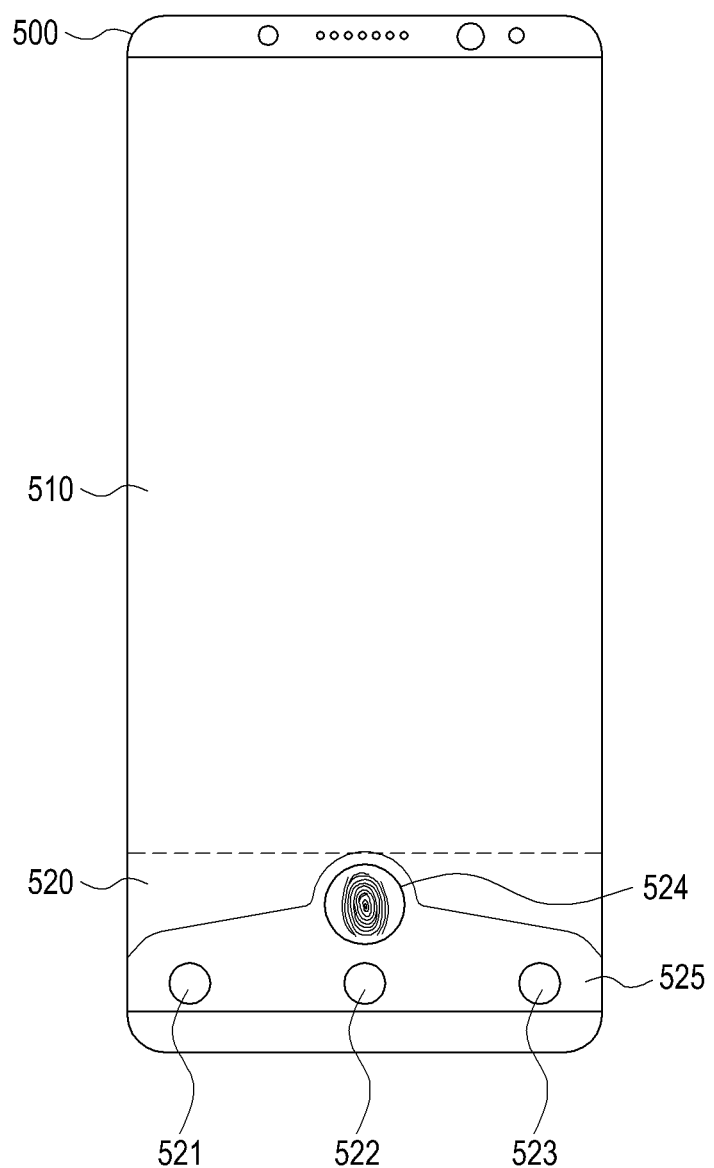
FIGS. 5A and 5B illustrate examples in which an electronic device provides an interface related to a fingerprint sensor, according to an embodiment of the present disclosure.
Figure 5B:
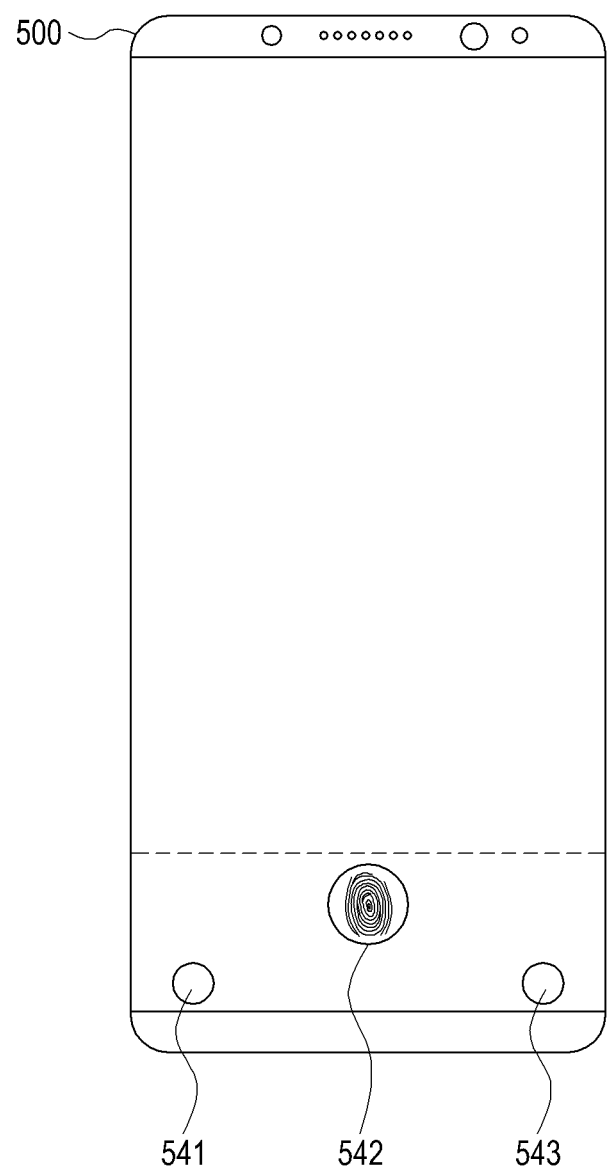

FIGS. 5A and 5B illustrate examples in which an electronic device provides an interface related to a fingerprint sensor, according to an embodiment of the present disclosure.

Referring to FIG. 5A, an electronic device 500 may display a user interface on a first layer including a first area 510 and a second area 520 and display function buttons 521, 522, and 523, and a fingerprint input button 524 in a control area 525 corresponding to a second layer as a panel type.

The processor 120 may integrate a function of the home button 522 into a function of the fingerprint input button 542 when neither the home button 522 nor the fingerprint input button 524 can be displayed because the second area 520 is too narrow, when the home button 522 is not required to be displayed separately from the fingerprint input button 524, or to increase usability. In this case, the fingerprint input button 542 may also perform the function of the home button 522 as illustrated in FIG. 5B.

When the electronic device 500 supports a force input, the home button function may be performed by the terminal in accordance with the force input for classifying the type of input according to the strength of pressure on the fingerprint input button 542. Alternatively, when the electronic device 500 does not support the force input, the electronic device 500 may perform a home button function according to the time (i.e., a long press touch) for which the contact with the fingerprint input button 542 is made.

When the fingerprint input button 542 and other function buttons 541 and 543 are integrated, one button may be displayed on the display and a function related to the corresponding function may be performed depending on the input from the user.

The second area 520 may include a minimum area for maintaining a predetermined interval between objects so that the user is capable of separately touching the fingerprint input button 524 and the function buttons 521, 522, and 523.

In the split mode, the size of the second layer on which the control area is displayed may be changed in accordance with the resolution of the first layer on which the user interface is displayed, and locations of the function buttons or the fingerprint input button, or the size of the second area may be changed in accordance with a recognition area of a fingerprint input sensor or a pressure sensor included in the touch screen display.

Figure 6:
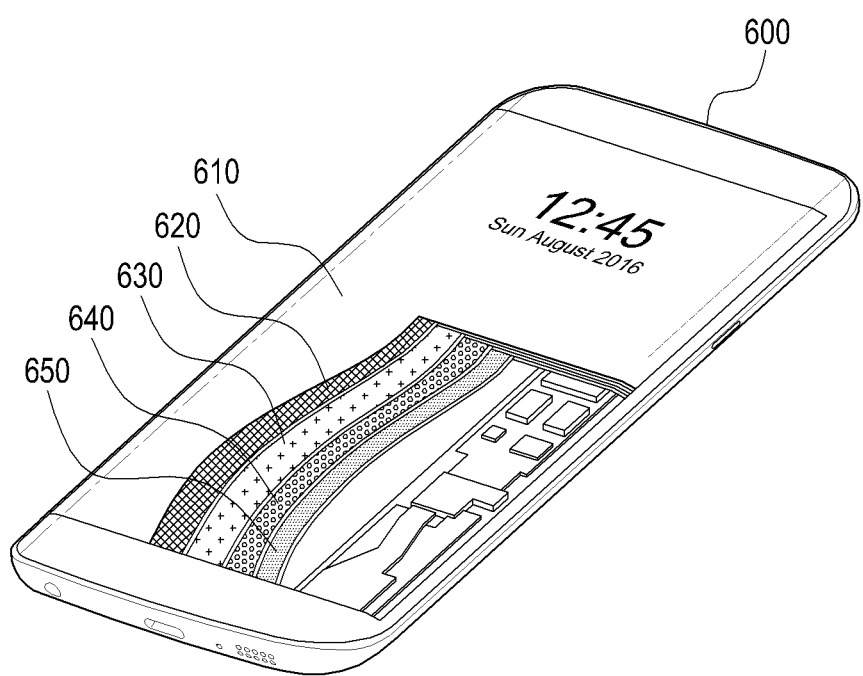
FIG. 6 illustrates the internal structure of an electronic device, according to an embodiment of the present disclosure.

FIG. 6 illustrates the internal structure of an electronic device, according to an embodiment of the present disclosure.

A touch screen display of an electronic device 600 may include a device for inputting a fingerprint in all or some of the areas of the display. Referring to FIG. 6, the electronic device 600 has a structure in which a display panel 640, a fingerprint sensor panel 630, a touch screen 620, and a window 610 (i.e., a cover glass) are sequentially stacked on a force touch panel 650, which is the bottommost layer.

The fingerprint sensor of the electronic device may be embodied as various types, such as printing a fingerprint recognition electrode (pattern) on the surface of the cover glass for protecting the display (i.e., in/on cover glass), configuring one layer including an electrode for recognizing a fingerprint on a display panel (i.e., over-display), configuring a sensor for recognizing a fingerprint or an electrode in a layer form under a display panel (i.e., under-display), and configuring an electrode for recognizing a fingerprint in a pixel within a display panel or between pixels (i.e., in-display).

FIG. 6 illustrates the electronic device in the in/on cover glass structure or the over-display type in which the fingerprint sensor panel 630 is stacked on the touch display panel 640. The fingerprint sensor panel 630 is stacked on the whole display, so that the fingerprint input by the user may be detected by the fingerprint sensor on the whole touch screen display.

The type of fingerprint sensor integrated into the display may be provided in various forms, such as an optical sensor for acquiring a fingerprint image of the surface of the finger through photo diodes, a capacitive sensor for acquiring a fingerprint image through distinction between a part that contacts an electrode and a part that does not contact the electrode, and an ultrasonic sensor for acquiring a fingerprint image based on a phase difference of ultrasonic waves reflected by a piezo element. The scope of the present disclosure, however, is not limited to any of the above-described types of fingerprint sensors, and the user's fingerprint input may be detected through various types of fingerprint sensors.

Figure 7:
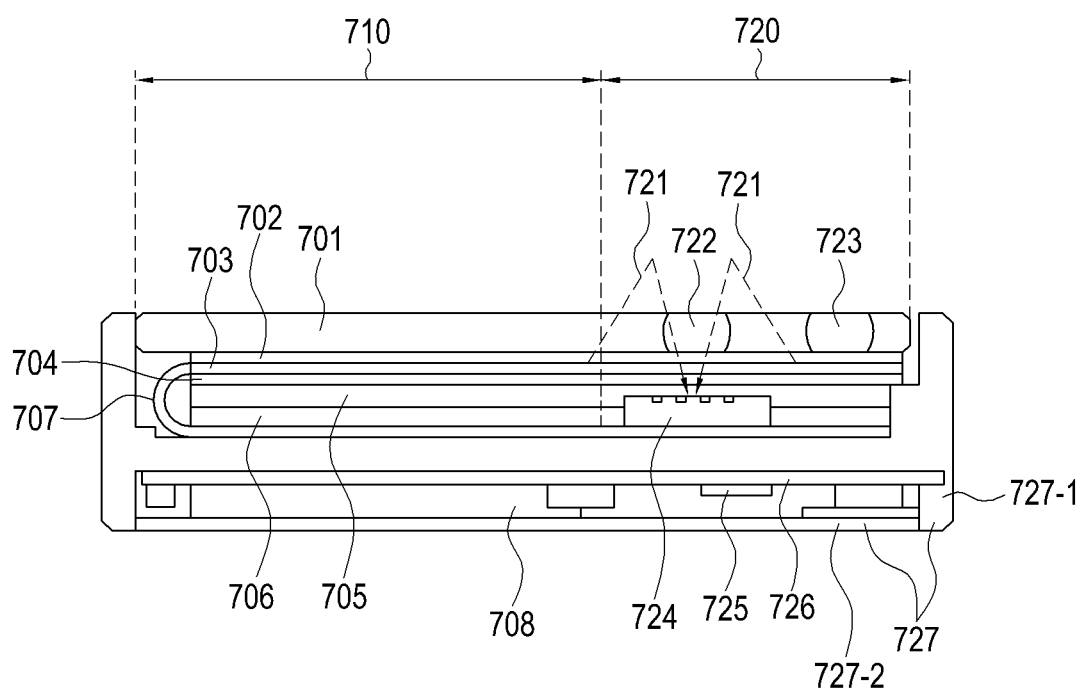
FIG. 7 is a cross-sectional view of an electronic device, according to an embodiment of the present disclosure.

FIG. 7 is a cross-sectional view of an electronic device, according to an embodiment of the present disclosure.

A fingerprint sensor can be integrated into a touch screen display of an electronic device, and the electronic device may include an under display type structure, in which a sensor for recognizing a fingerprint and an electrode is configured in a layer form under a display panel. In both a first area 710 and a second area 720, a window 701 (i.e., a cover glass), a touch screen panel 702, a display 703, a force touch panel 704, a first protection layer 705 (i.e., an embo tape), a second protection layer 706 (i.e., a copper sheet), and a flexible printed circuit board (FPCB) 707 are stacked. In the case of the under display type, one of an optical fingerprint recognition sensor and an ultrasonic type fingerprint sensor may be applied. When an optical fingerprint recognition sensor 724 is applied, the second area 720 may be limited to a range in which a fingerprint can be recognized using light 721, and a fingerprint input button 722 or a function button 723 may be displayed on a display 703 of the second area 720. The fingerprint input button 722 may be preset based on the size, color, and display location in order to increase the recognition accuracy of the optical fingerprint sensor. A housing 727 includes a first plate 727-1 that exposes the display 702 and a second plate 727-2 (i.e., a rear cover) that faces a direction opposite the first plate. The housing 727 includes a printed circuit board 726 (PCB) having a device 725 attached to the PCB 726. A battery 708 for supplying power to the electronic device is mounted within the housing 727.

Figure 8A:
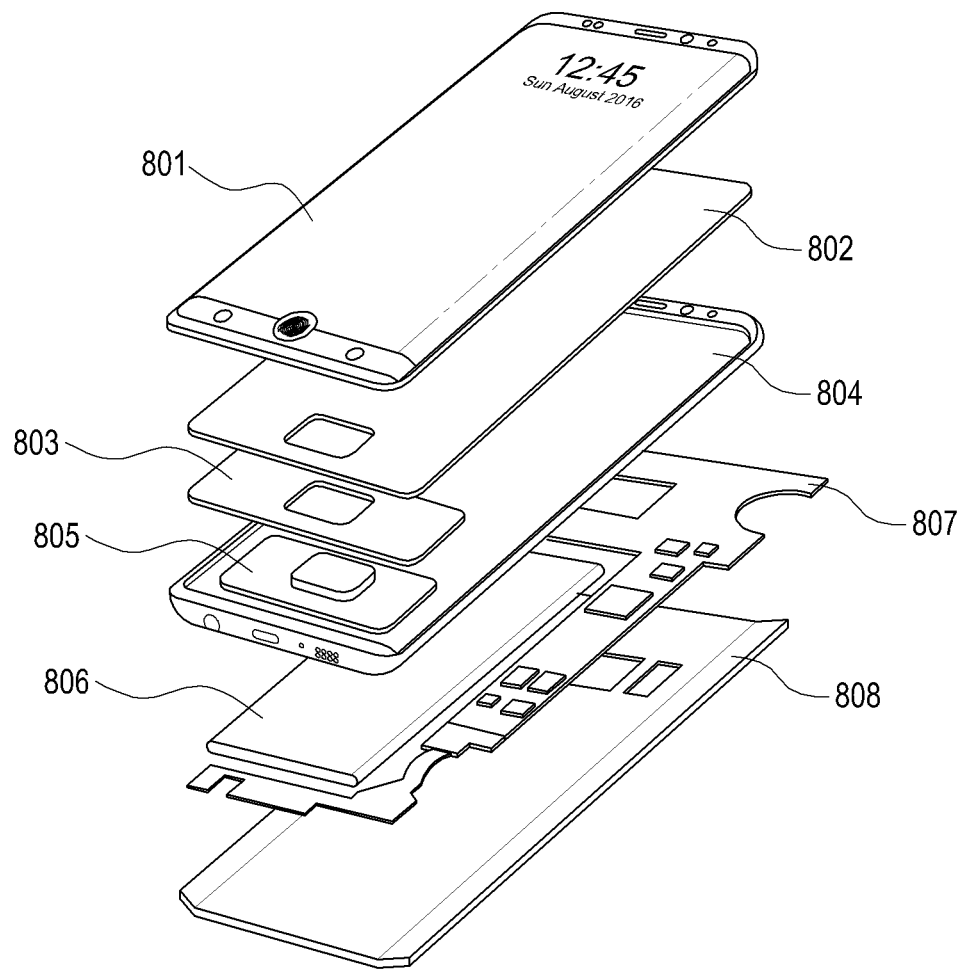
FIG. 8A is an exploded perspective view of an electronic device, according to an embodiment of the present disclosure.

FIG. 8A is an exploded perspective view of an electronic device, according to an embodiment of the present disclosure.

The electronic device may include a force touch panel and may detect a force touch input by the user. Referring to FIG. 8A, the electronic device includes a display panel 801, a digitizer panel 802, a force touch panel 803, a first plate 804, an optical fingerprint recognition sensor 805, a battery 806 for supplying power to the electronic device, a PCB 807, and a second plate 808 (i.e., a rear cover). The first plate 804 and the second plate 808 may constitute a housing. The display panel 801 may include a window, a touch screen panel, and a display. The touch screen panel and the display may be exposed through the first plate 804 and may have a first aspect ratio. In the digitizer panel 802, a loop coil may be arranged on a printed circuit board in an electromagnetic resonance (EMR) scheme, an electromagnetic wave may be generated by making current flow in the loop coil, and the generated electromagnetic wave may be absorbed by an EMR pen. The EMR pen may include a condenser and a loop, and may radiate the absorbed electromagnetic wave at a predetermined frequency. The electromagnetic wave radiated by the EMR pen may be absorbed again by the loop coil of the printed circuit board, and accordingly, induced electromotive force may be generated in the loop coil. The digitizer panel 802 may detect a position of the pen by comparing sizes of electromotive forces of coils. The force touch panel 803 may detect input according to the degree of pressure of a user's touch input, and a detailed configuration of the force touch panel 803 and the pressure detection method will be described in detail with reference to FIGS. 8B and 8C. Further, the electronic device may detect input from the user through an optical fingerprint recognition sensor 805. A wireless communication circuit 807 may be located within the housing and may be electrically connected to a display of a display panel 801 and a processor. Further, a memory may be electrically connected to the processor. The battery 806 and the wireless communication circuit 807 may be located between a first plate 804 and a second plate 808. The configuration of FIG. 8A is only an example, and the scope of the present disclosure is not limited by the configuration.

Figure 8B:
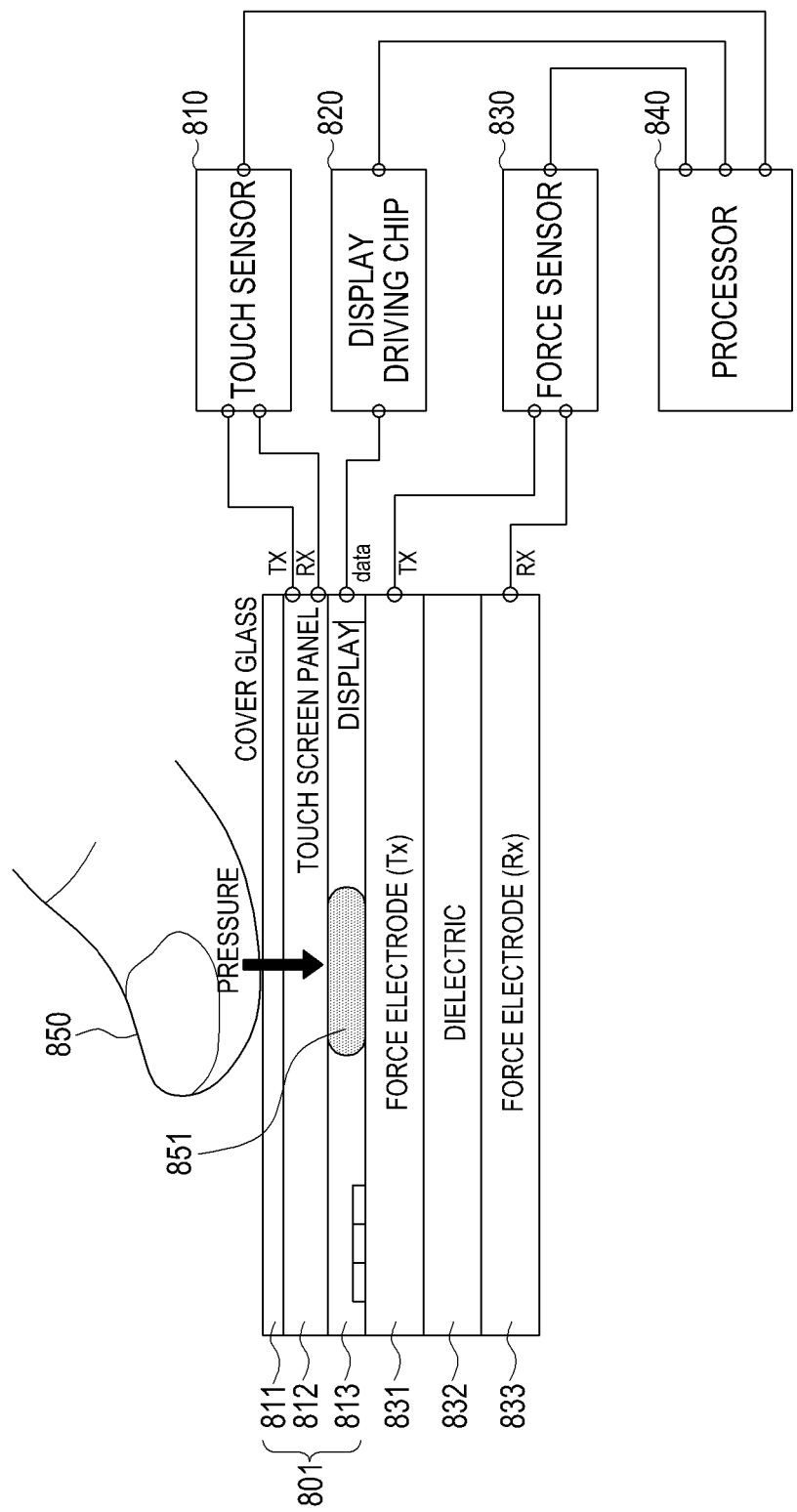
FIG. 8B illustrates an example of a circuit connection configuration of an electronic device, according to an embodiment of the present disclosure.
Figure 8C:
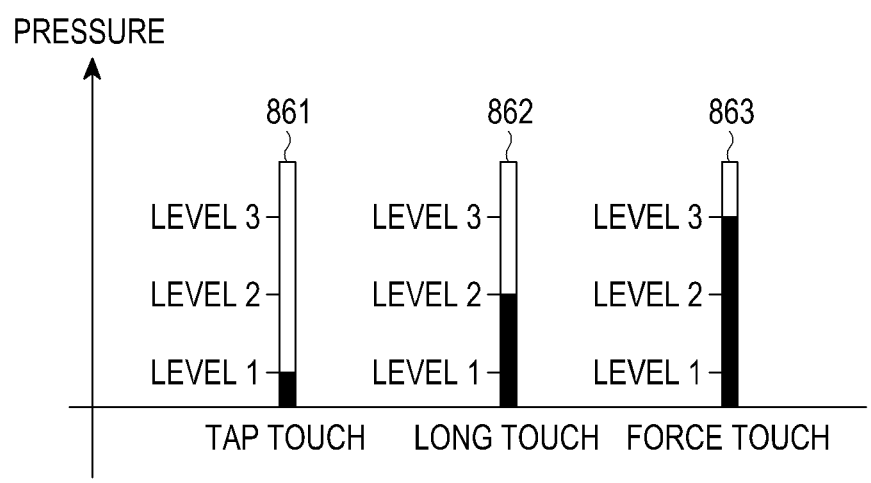
FIG. 8C illustrates an example of a touch input distinction reference, according to the pressure shown in FIG. 8B.

FIG. 8B illustrates an example of a circuit connection configuration of the electronic device, according to an embodiment of the present disclosure. FIG. 8C illustrates an example of a reference for distinguishing a touch input according to the pressure of FIG. 8B.

FIG. 8B illustrates a configuration and an operation principle of the force touch panel. The display panel 801 includes a window 811 (i.e., a cover glass), a touch screen panel 812, a display 813, and a function button 851 displayed on the display 813. When a force input by a user 850 is applied to the function button 851 displayed on the display, a touch sensor 810 may determine whether a touch input is made and a force sensor 830 including two force electrodes 831 and 833 (RX and TX) and a dielectric 832 may detect a pressure intensity of the force input. When signals detected by the touch sensor 810 and the force sensor 830 are transmitted to the processor 840, the processor 840 may generate a signal for controlling the display 813 based on the received signals and transmit the generated signal to a display driving chip 820.

Referring to FIG. 8C, the processor 840 may detect different pressure levels for a tap touch 861, a long touch 862, and a force touch 863, based on the pressure intensity detected by the force sensor 830. The pressure levels may be divided into level 1, level 2, and level 3. The processor may determine a tap touch 861, sensed for a short time, when it is determined that the pressure intensity is close to level 1; determine a long touch 862, sensed for a long time, when it is determined that the pressure intensity is close to level 2; and determine a force touch 863, which is an input that is usually sensed by pressure, when it is determined that the pressure intensity is close to level 3. The processor may generate a control signal corresponding to the detected pressure.

Figure 9A:
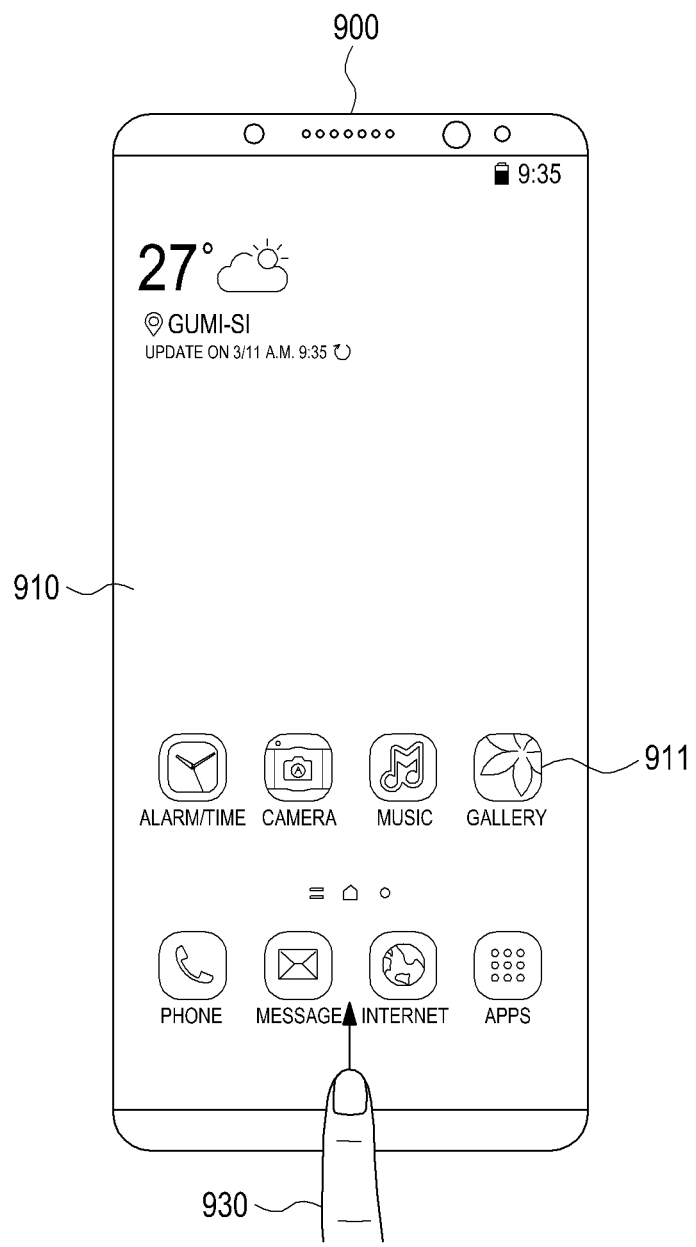
FIGS. 9A and 9B illustrate examples of execution of a home screen and a gallery application on a display of an electronic device, according to an embodiment of the present disclosure.
Figure 9B:
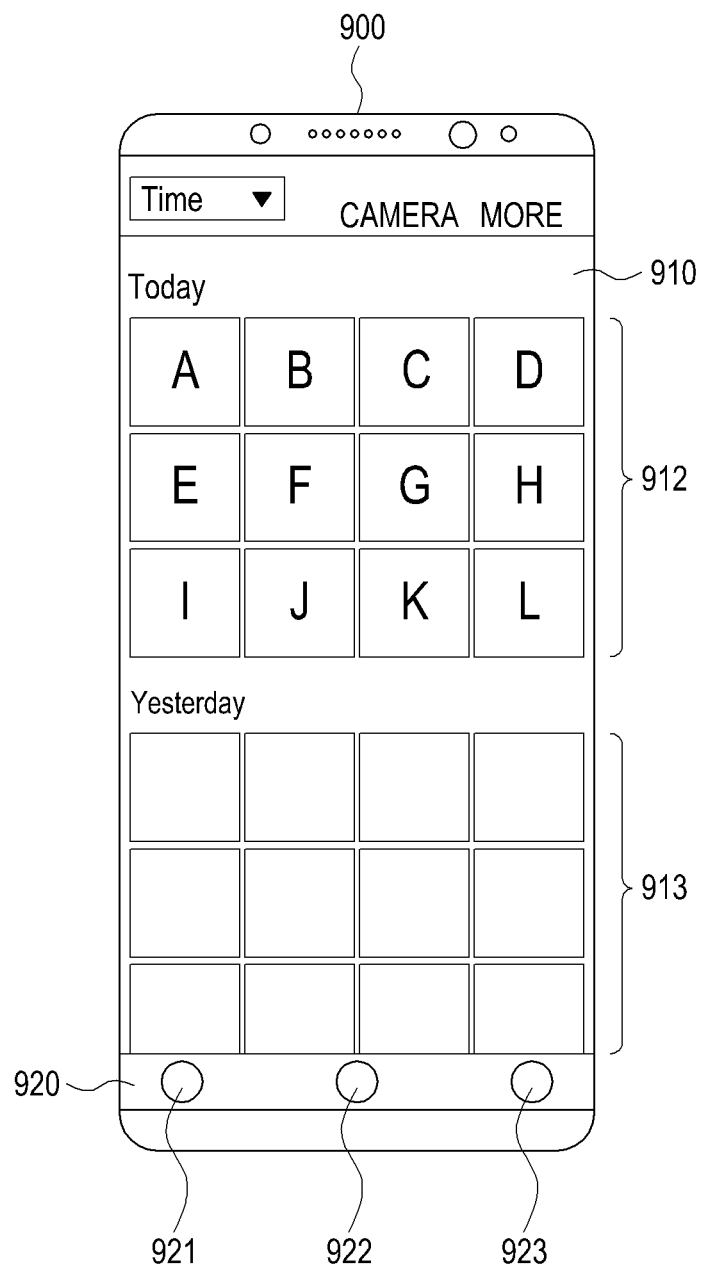

FIGS. 9A and 9B illustrate examples of executing a home screen and a gallery application on a display of an electronic device, according to an embodiment of the present disclosure.

Referring to FIGS. 9A and 9B, a touch screen display of an electronic device 900 may display a home screen on an entire area of the touch screen in a floating mode and overlap a second layer 920 on a first layer 910. Referring to FIG. 9A, the processor (i.e., processor 120) may display a home execution screen in a hidden mode. The processor 120 may display the home execution screen in an entire area of the touch screen display without displaying the second layer 920. When the processor 120 detects a touch input 930 of dragging the touch screen display from a lower end to an upper end through the touch screen display, the processor 120 may display the second layer 920 overlapping the first layer 910, as illustrated in FIG. 9B. When the user executes a gallery application 911 through a touch input, the first layer 910 of FIG. 9A may be switched such that contents 912 and 913 stored in the memory 130 are arranged as illustrated on the layer 910 of the touch screen display of the electronic device 900 of FIG. 9B.

When the processor 120 executes the gallery application 911, the processor may compare a first aspect ratio and a second aspect ratio. The first aspect ratio of the touch screen display according to the present disclosure may have a ratio of 18.5:9 and a resolution of 1440*2960. Referring to FIG. 9A, the home screen may be displayed with the resolution of 1440*2960, which is the same as the resolution of the touch screen display, and the executed gallery application 911 may support a resolution of 1440*A (A>2960), having no limitation on the vertical resolution in proportion to the number of pieces of content 912 and 913. In this case, the display mode may be determined to be the floating mode, and the processor 120 may display the second layer 920 including function buttons 921, 922, and 923 on the first layer 910 including the gallery application 911 on the display to be substantially identical to the touch screen display. Alternatively, the processor 120 may display a user interface of the gallery application over substantially the entire area of the touch screen display, and display at least one function button on the touch screen display to at least temporarily overlap the user interface.

Figure 10A:
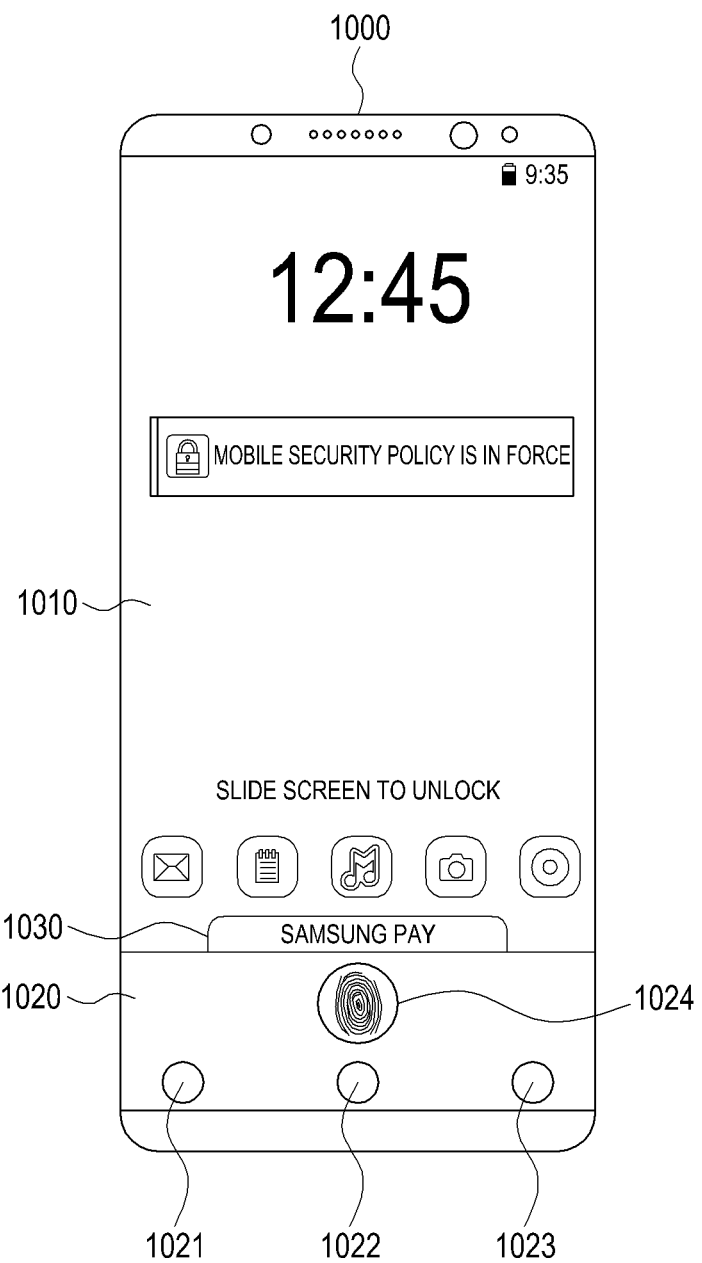
FIGS. 10A and 10B illustrate examples of a configurations for providing a fingerprint authentication interface of an electronic device, according to an embodiment of the present disclosure.
Figure 10B:
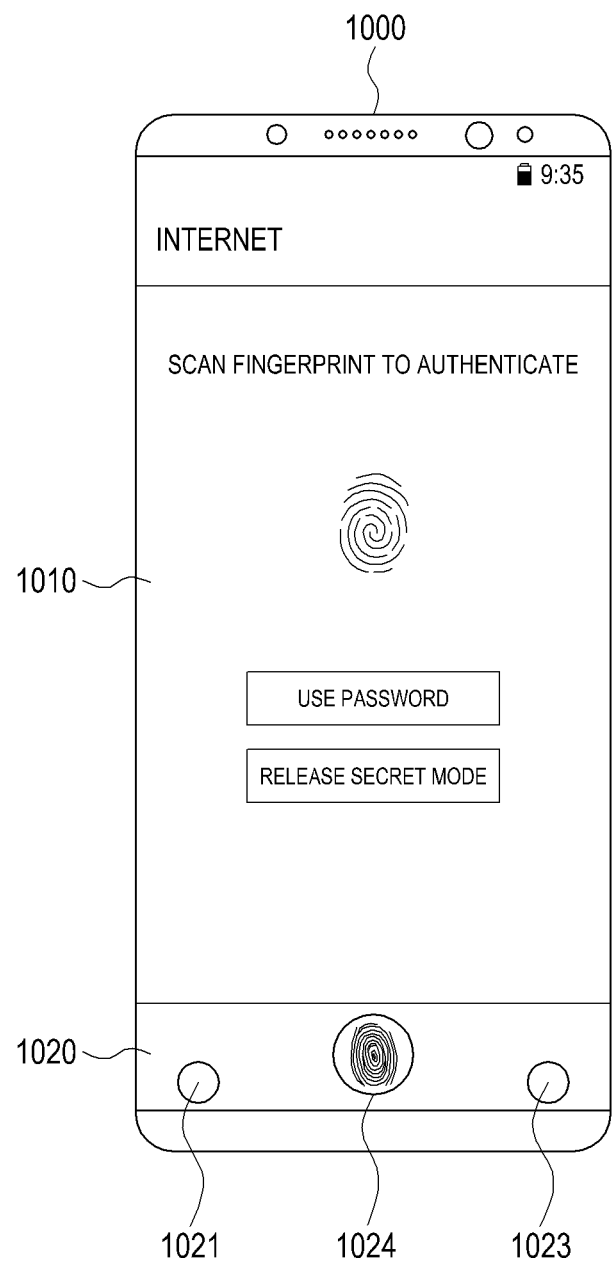
Figure 11A:
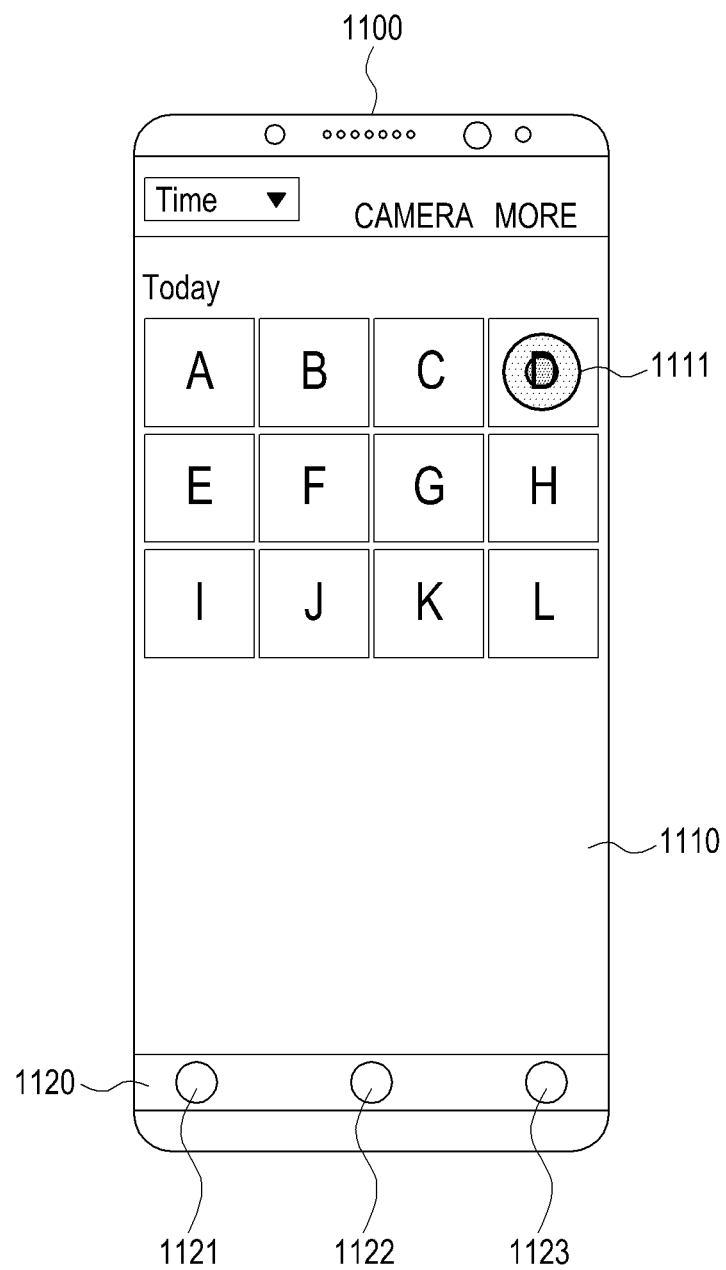
FIGS. 11A to 11D illustrate examples of a configurations for performing a function of fingerprint authentication by an electronic device, according to an embodiment of the present disclosure.
Figure 11B:
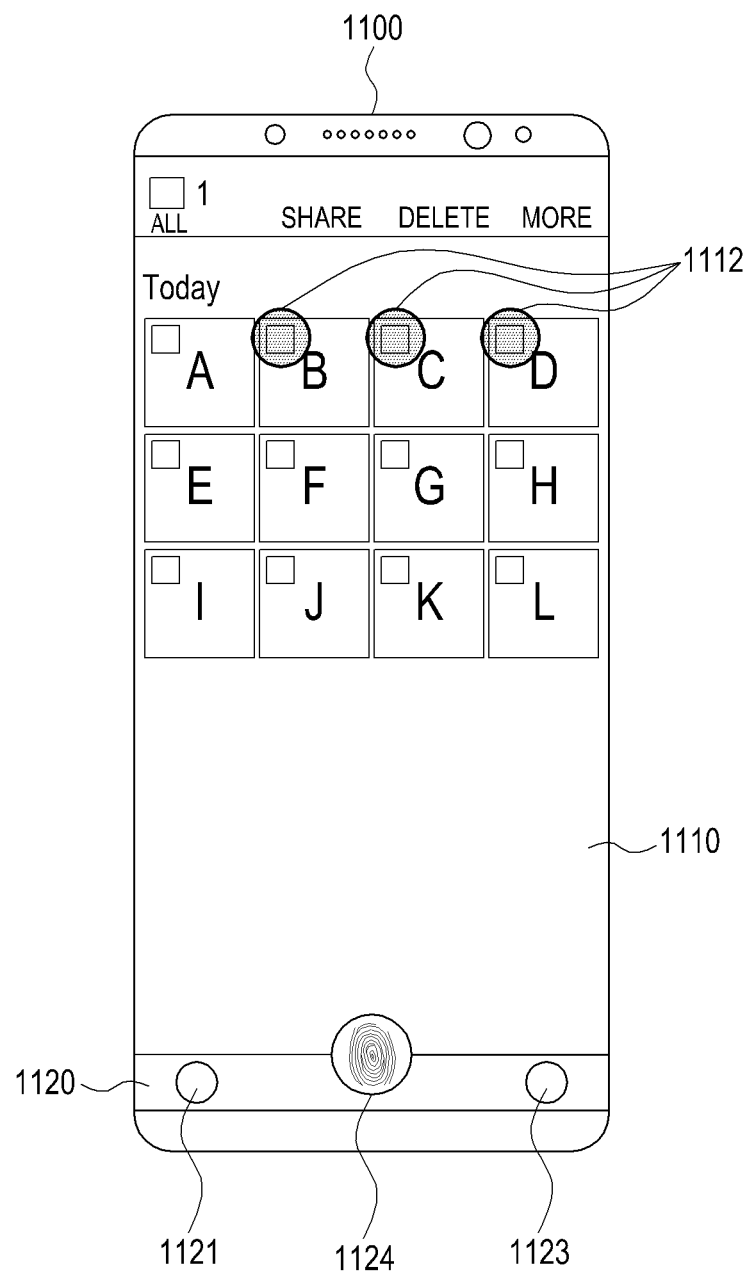
Figure 11C:
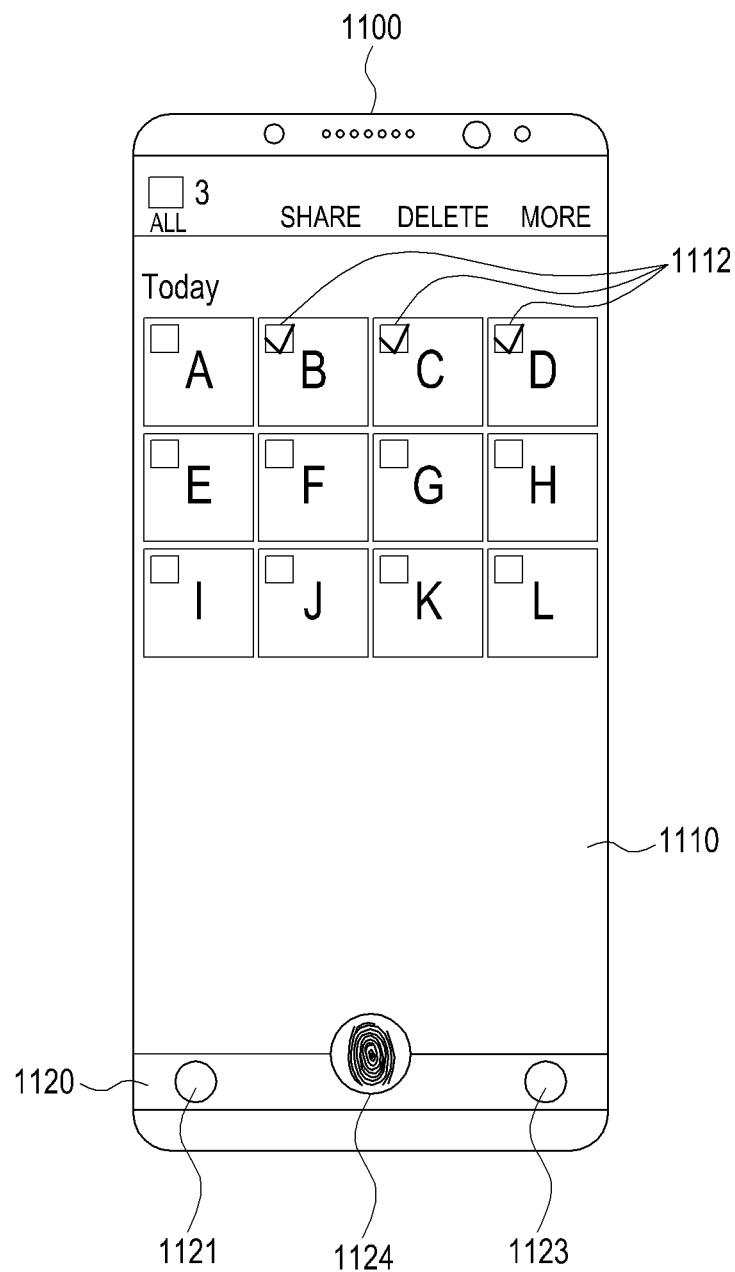
Figure 11D:
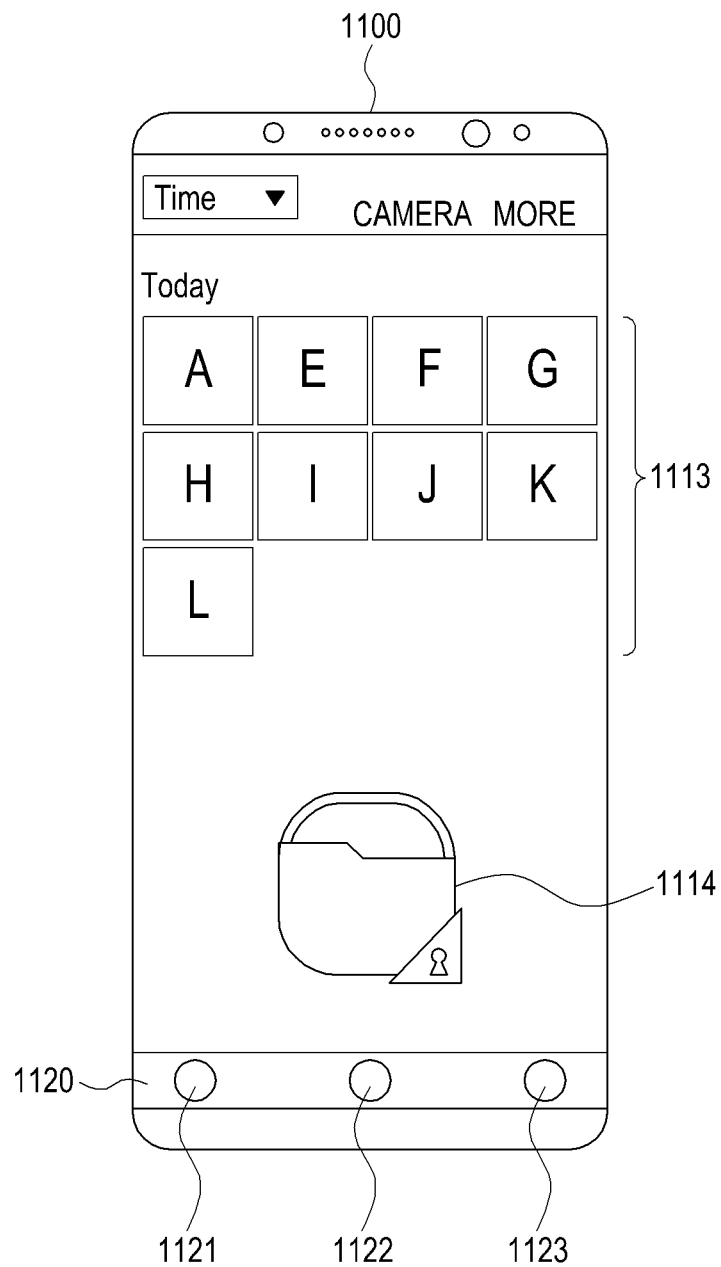

FIGS. 10A and 10B illustrate examples of a configuration for providing a fingerprint authentication interface of an electronic device, according to an embodiment of the present disclosure.

Referring to FIG. 10A, fingerprint authentication is required in response to attributes related to security of application content or a user's touch input. The processor may display function buttons 1021, 1022, and 1023, and a fingerprint input button 1024 in a second area (control area) of the touch screen display.

The application executed by the processor 120 may have a personal authentication function through authenticating biometric information, for example, fingerprint information. A lock screen displayed in a first area 1010 may make a request for user fingerprint authentication in order to enter the home screen. Alternatively, when the processor detects an input of sliding a payment application execution tab 1030 on the display, the processor may make a request for user fingerprint information authentication in order to provide a payment function to the user. Alternatively, when an application such as personal email, payment, and bank transaction is executed by the processor, the processor may make a request for authentication through biometric information for login. When a user's biometric authentication (i.e., fingerprint authentication) is required, according to the attributes of the application, the processor of the electronic device 1000 may display a biometric information authentication interface on the touch screen display.

The processor may display a fingerprint input button 1024 in the form of a soft key in some areas of the display when user fingerprint authentication is required, according to the attributes of the application. For example, a control area may be displayed in a second area based on a display mode determined according to the result of a comparison between a first aspect ratio and a second aspect ratio and a user's biometric authentication request. The fingerprint input button 1024 may be displayed along with the function buttons 1021 and 1023. The display location of the fingerprint input button 1024 may be the same as the location of the fingerprint sensor integrated into the touch screen display, and may have attributes (i.e., brightness, color, and flickering pattern) for improving a fingerprint recognition rate.

Referring to FIG. 10B, when the location of the function button and the location of the fingerprint sensor overlap each other completely or partially, the fingerprint input button 1024 may perform a complex function (i.e., a function of the function button 1022 (i.e., the home key)). When the fingerprint input button 1024 includes the function of the function button, the form of the fingerprint input button 1024 may be changed to the form of the corresponding function button or to have the attributes of the corresponding function button. According to an embodiment of the present disclosure, the electronic device 1000 may additionally include a force touch panel and a force touch sensor and may detect a user's pressure gesture in order to distinguish an execution gesture for the complex function of the fingerprint input button 1024.

FIGS. 11A to 11D illustrate examples of a configuration for performing a function of fingerprint authentication by an electronic device, according to an embodiment of the present disclosure.

Referring to FIGS. 11A to 11D, the processor 120 may perform a preset function for each function button in response to a user input for function buttons 1121, 1122, and 1123. The function buttons 1121, 1122, and 1123 may perform an electronic device control function or a mapping function for each function button in response to a user input. The electronic device 1100 of FIG. 11A may detect an input for selecting one piece of content 1111 or selecting movement of a plurality of pieces of content 1112 to a secure folder by the user when a gallery application is executed, and may also display a fingerprint authentication button 1124 in a second area.

The electronic device may move the selected image 1111 or plurality of images 1112 to the secure folder in response to user input for the fingerprint input button 1124. When the image selected by the processor is moved to the secure folder 1114, the moved image 1112 is not displayed in the existing folder of the gallery application. The location at which the content moved to the secure folder 1114 is stored may be different from the location at which the content of the existing gallery application is stored. In order to identify the moved content in the secure folder, the user may perform personal authentication through any of various methods such as password input and pattern recognition, as well as fingerprint input. The types of applications that can be moved to the secure folder after the user performs user authentication on the selected file may include, for example, a gallery application, a my file application, a note application, a calendar application, Excel, Power Point, Word, a music playback application, a cloud application, and a movie playback application.

FIGS. 12A to 12D illustrate examples for the configuration in which an electronic device performs a function by fingerprint authentication, according to an embodiment of the present disclosure.

FIGS. 12A to 12D relate to a secret mode, in which, when the user controls the electronic device, a user interface that does not display content, such as a particular webpage 1213 requiring biometric information authentication to display the content, is provided in order to not expose private information, such as user login information of webpages 1212, 1213, and 1214 that the user has visited, email information, or webpage histories. Alternatively, instead of the content of the particular webpage 1213, a preset graphic object 1214 may be displayed without displaying the content of the particular webpage 1213. When the processor detects an input for a tab button 1211 for identifying the webpage 1212, 1213, or 1214, which the user previously visited, displayed in the first area 1210, the processor may perform encryption and limit display such that the content or the webpage 1213, which the user does not want to reveal, is not displayed on the display in accordance with outside exposure limit settings. Encrypted information may be provided to display password information and move to the corresponding webpage 1210 after user authentication through the fingerprint authentication interface 1222 displayed in the second area 1220.

The limit on content exposure to the display may be performed in various ways. For example, in the case of content within a webpage, when there is login information within the webpage, only the webpage login information may be displayed. In the case of a webpage processed to be hidden, the entire webpage which the user has visited may be prevented from being displayed in order to protect privacy. In the case of a shopping page, the display of some contents, which the user can purchase after login or has already purchased, may be restricted.

Figure 13A:
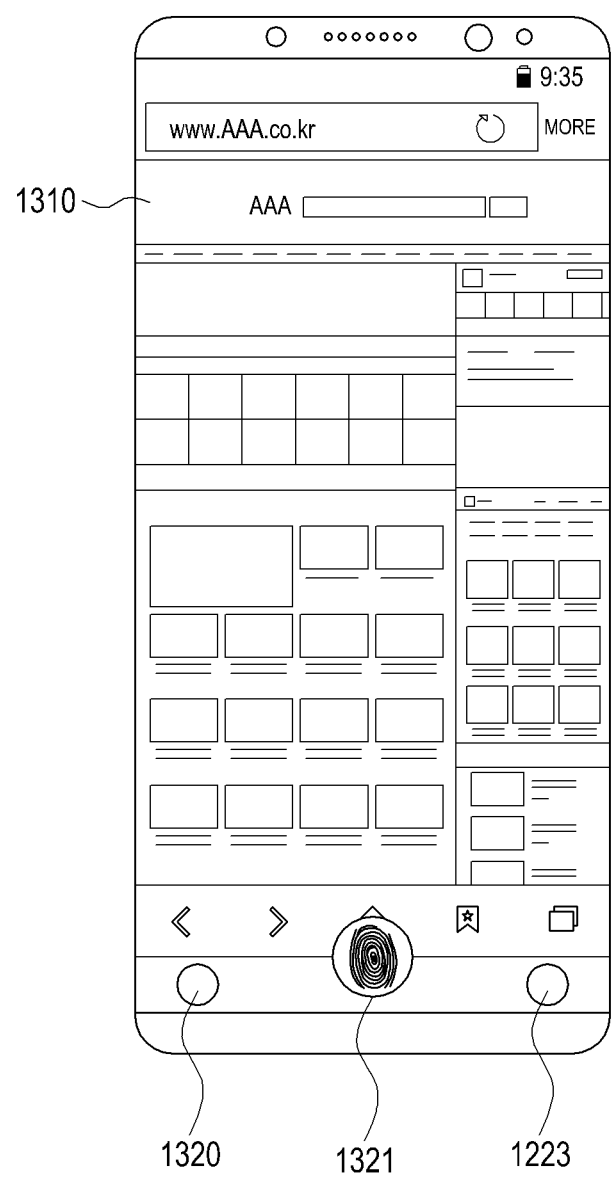
FIGS. 13A and 13B illustrate examples for the configurations of executing a security mode by an electronic device, according to an embodiment of the present disclosure.
Figure 13B:
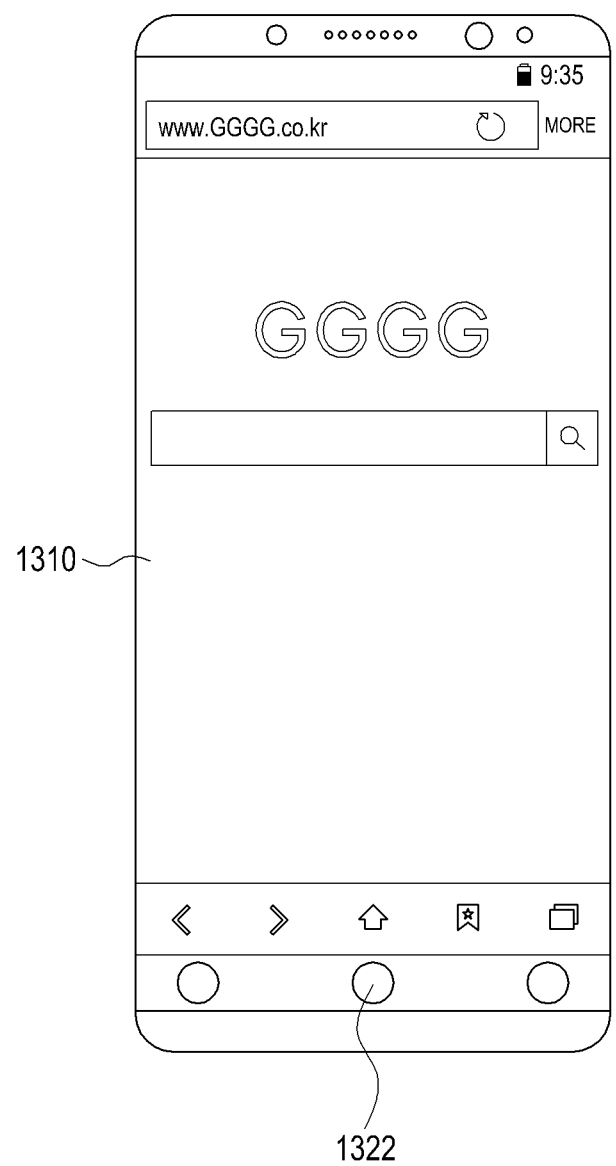

FIGS. 13A and 13B illustrate examples for the configuration of executing a security mode by an electronic device, according to an embodiment of the present disclosure.

Figure 12A:
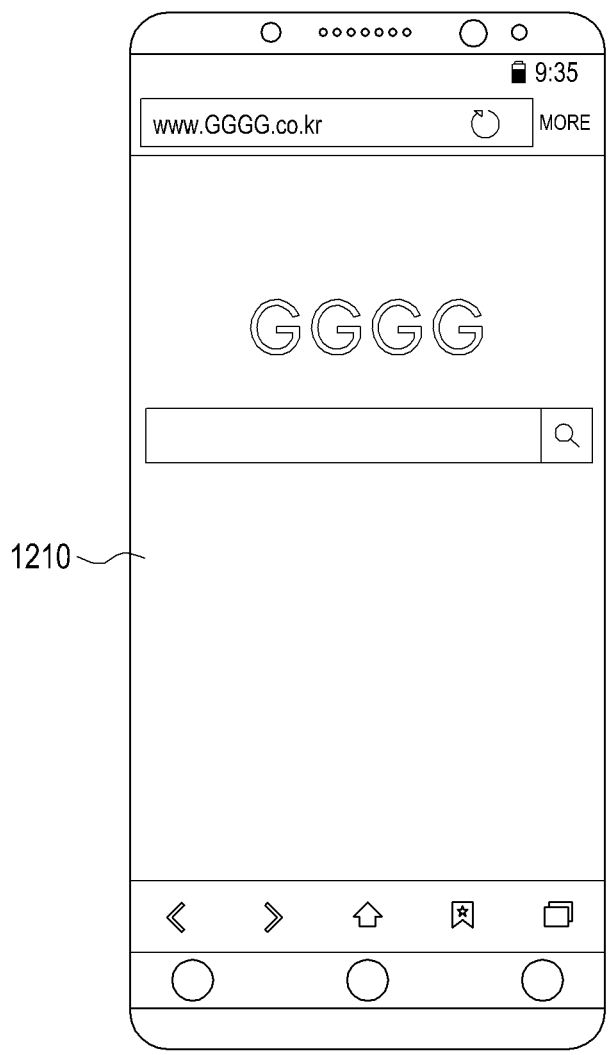
FIGS. 12A to 12D illustrate examples for the configurations in which an electronic device performs a function by fingerprint authentication, according to an embodiment of the present disclosure.
Figure 12B:
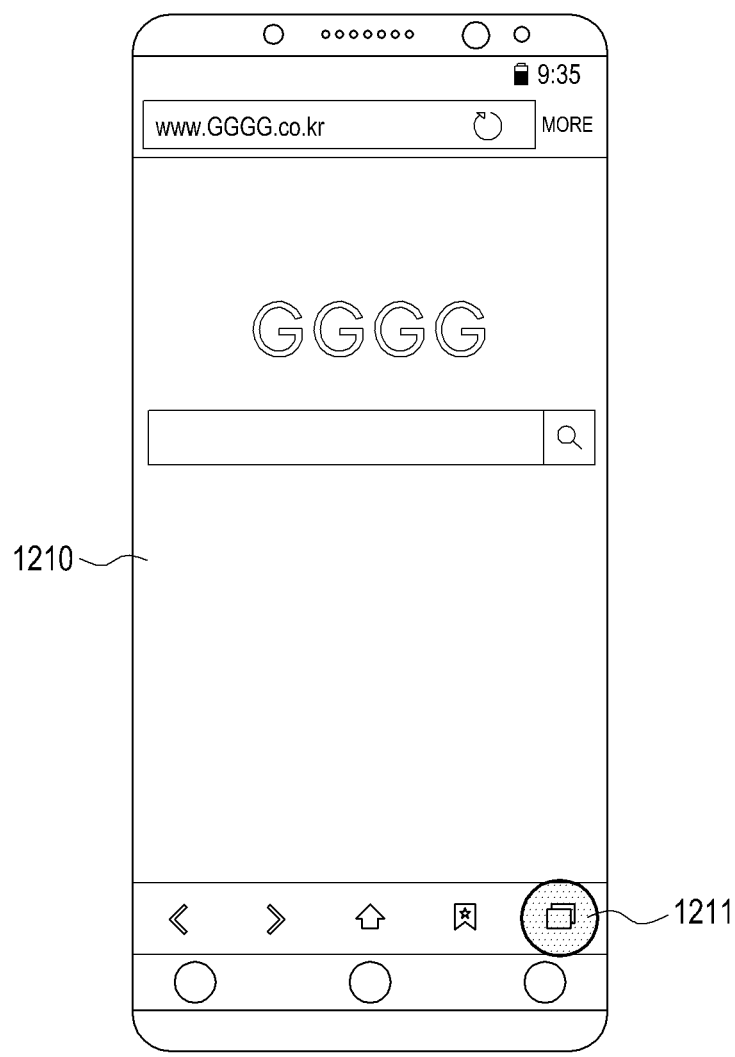
Figure 12C:
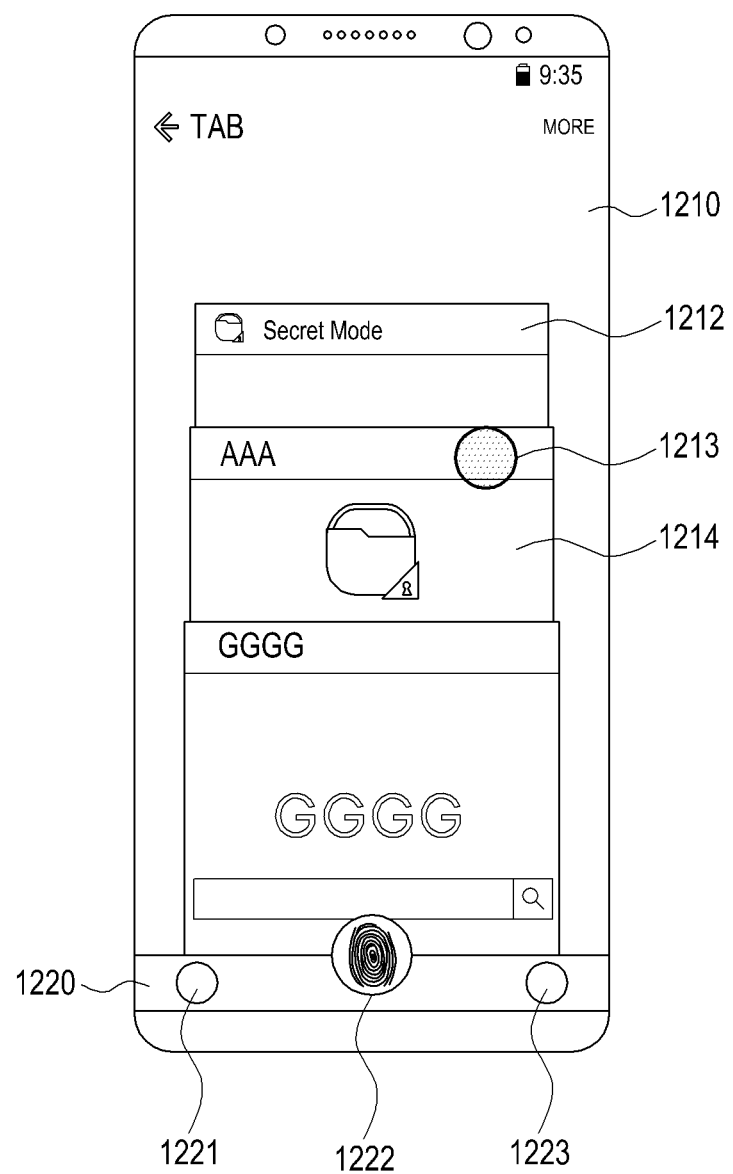
Figure 12D:
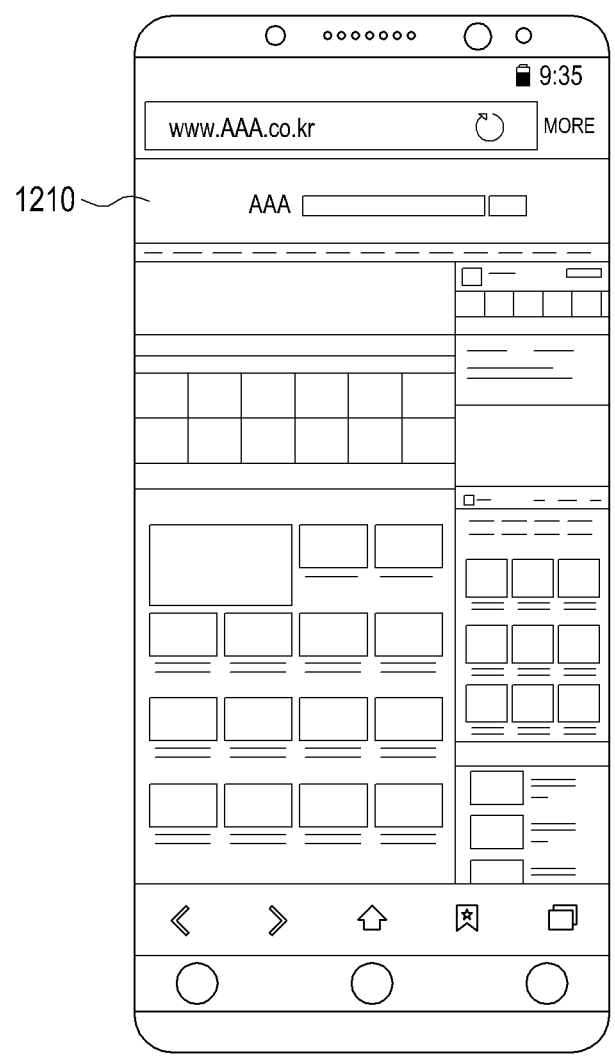

FIGS. 13A and 13B describe the execution of a fast secret mode. The processor 120 may identify content requiring security in each application and store information on the identified content, as in the examples of FIGS. 11A to 11D and FIGS. 12A to 12D. When input related to the content requiring security (i.e., the webpage 1213 in FIG. 12C) is detected, the processor 120 may support a fast secret mode by displaying a fingerprint authentication interface on the display even though separate input by the user is not detected. For example, when the input of the tab button 1211 by the user is detected as illustrated in FIG. 12B in the state in which a webpage 1310 is executed (the processor 120 has already stored information indicating that content related to the tab button 1211 is content requiring security in the memory 130), the processor may display a fingerprint input button 1321 in a second area 1320 and enter the fast secret mode through fingerprint authentication. Depending on the circumstances, the fingerprint input button 1321 may also perform the function of the home button. Upon entering the fast secret mode, the currently executed webpage 1310 may be hidden and switched to a predetermined particular webpage 1320 associated with the secret mode. When the switching to the particular webpage is completed, the fingerprint input button 1321 may be switched back to a home button 1322.

Figure 14:
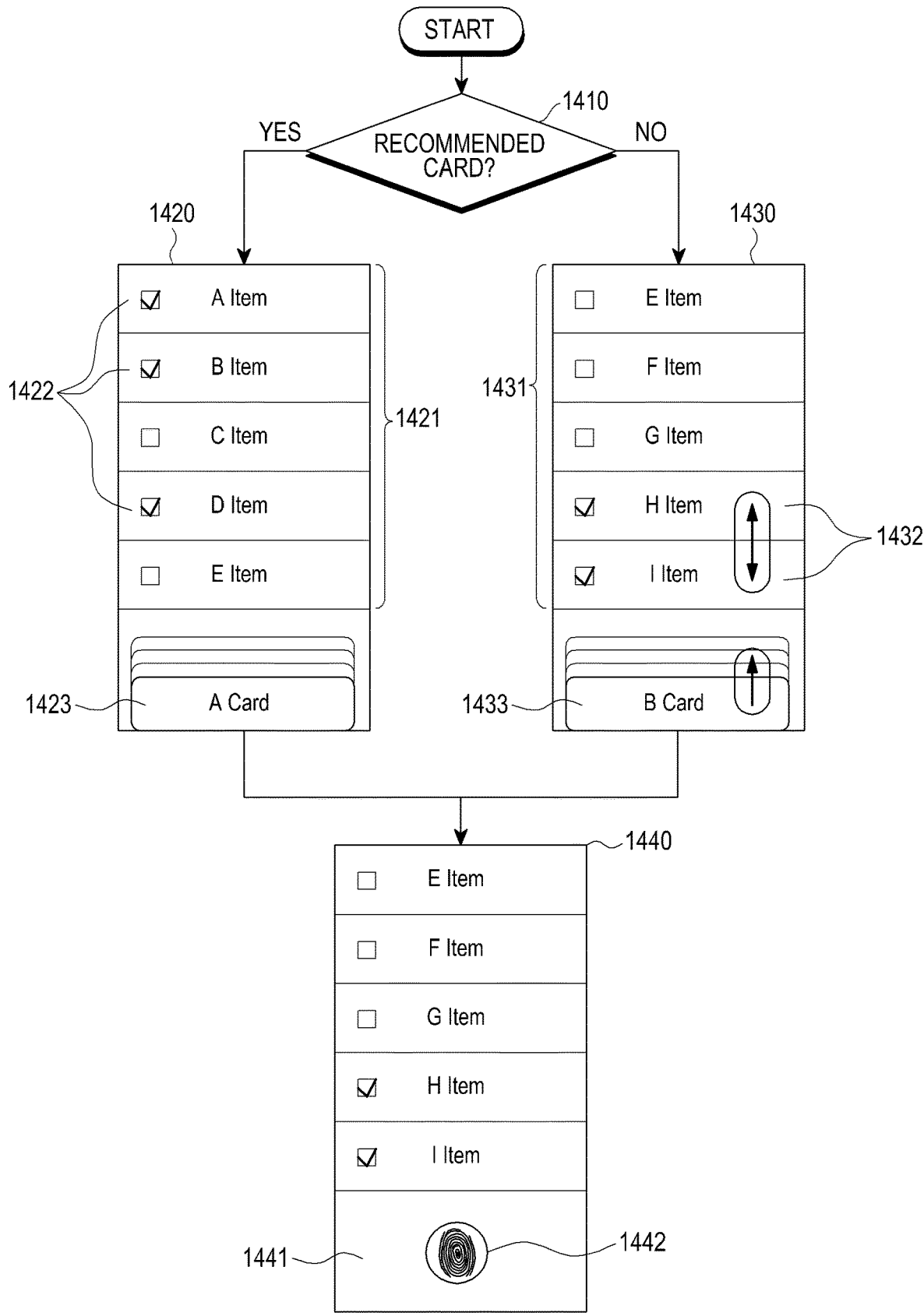
FIG. 14 is a flowchart illustrating a method of executing an application that provides a payment service by an electronic device, according to an embodiment of the present disclosure.

FIG. 14 is a flowchart illustrating a method of executing an application that provides a payment service by an electronic device, according to an embodiment of the present disclosure.

When the processor 120 executes a payment application, the processor 120 may identify whether there is a recommended card (i.e., credit card, debit card or gift card) for content to be paid among cards pre-registered in the payment application in step 1410. The recommended card may be commonly called the best card for the content to be paid, and may be determined depending on various elements such as a discount rate and point accumulation of the content. When it is determined that a recommended card is present, the processor 120 may display a recommended card in a second area 1423 based on attributes of content 1422 displayed in a first area 1420. When it is determined that no recommended card is present, content 1432 displayed in the first location 1431, and a card 1433 for payment may be selected by the user in operation 1430. When the selection is completed, the processor may display a payment interface for the selected content in a second area 1441, display a fingerprint authentication button 1442 in the second area 1441, and detect a fingerprint input by the user, so as to provide a payment function in operation 1440.

Figure 15:
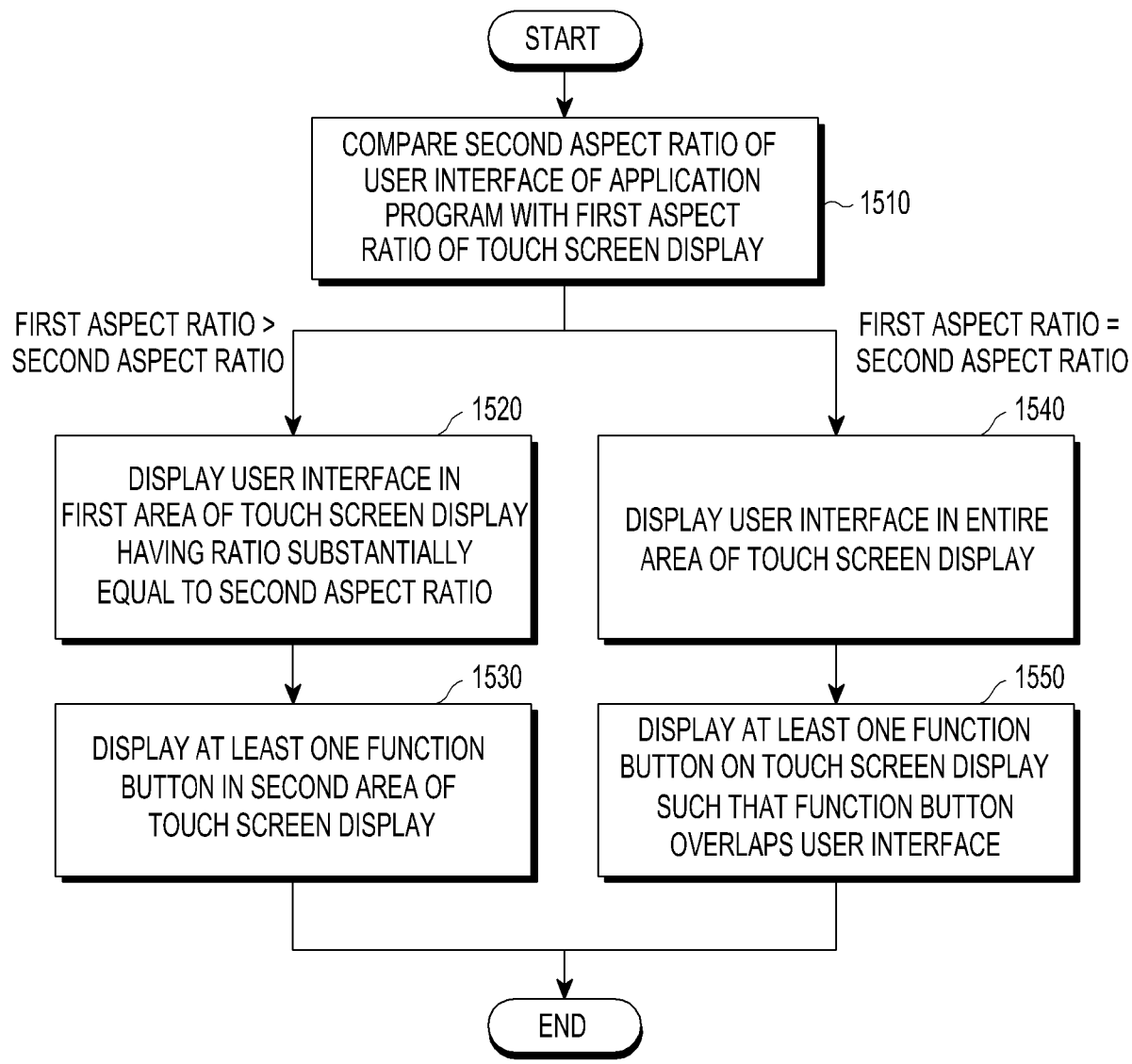
FIG. 15 is a flowchart illustrating a method of controlling a display by an electronic device, according to an embodiment of the present disclosure.

FIG. 15 is a flowchart illustrating a method of controlling a display by an electronic device, according to an embodiment of the present disclosure.

In step 1510, the processor 120 compares a second aspect ratio of a user interface of an application executed by the processor with a first aspect ratio of a display. The processor 120 may have different modes of displaying the user interface in cases in which the first aspect ratio is larger than the second aspect ratio and in which the first aspect ratio is the same as the second aspect ratio based on the result of the comparison.

When the second aspect ratio is smaller than the first aspect ratio, the processor 120 displays the user interface in a first area of the display in step 1520. The processor 120 displays at least one function button, which is not part of the application, in a second area of the touch screen display in step 1530. The user interface may be displayed in a split mode in the first area corresponding to the second aspect ratio of the application.

When the first aspect ratio is substantially the same as the second aspect ratio, the processor 120 displays the user interface over the entire area of the touch screen display in step 1540. The processor 120 displays at least one function button on the touch screen display such that the function button at least temporarily overlaps the user interface in step 1550. Since a detailed description of the method of controlling the display by the electronic device is the same as the description in FIGS. 1 to 14, it will be omitted.

According to an embodiment of the present disclosure, an electronic device includes a housing including a first plate and a second plate facing a direction opposite the first plate;

a touch screen display located between the first plate and the second plate, exposed through the first plate, and having a first aspect ratio; a wireless communication circuit located within the housing; at least one processor located within the housing and electrically connected to the display and the wireless communication circuit; and a memory located within the housing and electrically connected to the processor, wherein the memory may be configured to store at least one application and further store instructions, and, when executed, the instructions may cause the processor to acquire a second aspect ratio of a user interface of the application, compare the second aspect ratio with the first aspect ratio, display the user interface in a first area of the touch screen display having a ratio substantially equal to the second aspect ratio when the second aspect ratio is smaller than the first aspect ratio, display at least one function button, which is not a part of the application, in a second area of the touch screen display that does not overlap the first area, display the user interface over substantially the entire area of the touch screen display when the second aspect ratio is substantially equal to the first aspect ratio, and display the at least one function button on the touch screen display such that the function button at least temporarily overlaps the user interface.

A non-transitory computer-readable recording medium having a program recorded therein to be executed on a computer according to an embodiment of the present disclosure is provided. The program may cause, when executed by a processor, the processor to compare a first aspect ratio of a user interface of an application executed by the processor with a second aspect ratio of a touch screen display, display the user interface in a first area of the touch screen display having a ratio substantially equal to the second aspect ratio when the second aspect ratio is smaller than the first aspect ratio, display at least one function button, which is not a part of the application, in a second area of the touch screen display that does not overlap the first area, display the user interface over substantially the entire area of the touch screen display when the second aspect ratio is substantially equal to the first aspect ratio, and display the at least one function button on the touch screen display such that the function button at least temporarily overlaps the user interface.

According to an embodiment of the present disclosure, an electronic device includes a touch screen display having a first aspect ratio; a memory that stores at least one application; and a processor electrically connected to the touch screen display and the memory, wherein the processor may compare a second aspect ratio of a user interface of one of the at least one application with the first aspect ratio, display the user interface in a first area having the second aspect ratio of the touch screen display when the second aspect ratio is smaller than the first aspect ratio, display at least one function button, which is not part of the application, in a second area of the touch screen display that does not overlap the first area, display the user interface in an entire area of the touch screen display when the second aspect ratio is equal to the first aspect ratio, and display the at least one function button on the touch screen display such that the function button overlaps the user interface.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. An electronic device comprising:
    a housing including a first plate and a second plate facing in a direction opposite the first plate;
    a touch screen display located between the first plate and the second plate, viewable through the first plate, and having a first aspect ratio;
    a wireless communication circuit located within the housing;
    at least one processor located within the housing and electrically connected to the display and the wireless communication circuit; and
    a memory located within the housing and electrically connected to the processor,
    wherein the memory is configured to store at least one application and further store instructions, which when executed, cause the processor to:
        execute an application, from among the at least one application, selected from a home screen;
        acquire a second aspect ratio of a user interface of the application,
        compare the second aspect ratio with the first aspect ratio,
        when the second aspect ratio is smaller than the first aspect ratio, display the user interface in a first area of the touch screen display having a ratio substantially equal to the second aspect ratio, and display function buttons that are for navigating to other applications and are not a part of the application, in a second area of the touch screen display that does not overlap the first area, and
        when the second aspect ratio is substantially equal to the first aspect ratio, display the user interface in substantially an entire area of the touch screen display, and
    display the function buttons in the second area of the touch screen display, such that the function buttons overlap the user interface,
    wherein the function buttons include a first function button and a second function button, and
    wherein the first function button and the second function button are displayed in the second area based on a size of the second area being greater than or equal to a first size, and a third function button, having a first function of the first function button and a second function of the second function button, is displayed in the second area based on the size of the second area being smaller than the first size.

2. The electronic device of claim 1, wherein the function buttons include a home button.

3. The electronic device of claim 2, wherein the function buttons further include a button for returning to a previously displayed screen.

4. The electronic device of claim 3, wherein the function buttons further include a button for displaying at least one recently executed application.

5. The electronic device of claim 1, wherein the touch screen display includes a first side extending in a first direction and having a first length X, a second side extending in a second direction perpendicular to the first direction and having a second length Y shorter than the first length, a third side having the first length and extending parallel to the first side, and a fourth side having the second length and parallel to the second side, and the first aspect ratio is X:Y, which is larger than 16:9.

6. The electronic device of claim 5, wherein the first aspect ratio X:Y is within a range from 21:9 to 17:9.

7. The electronic device of claim 5, wherein the first area includes a first edge extending in the first direction and having a length Z, which is shorter than X, and a second edge extending in the second direction and having a length substantially equal to Y.

8. The electronic device of claim 7, wherein the second area includes a third edge extending in the first direction and having a length equal to a difference between X and Z (X-Z) and a fourth edge extending in the second direction and having a length substantially equal to Y.

9. The electronic device of claim 7, wherein the first area is adjacent to the second side of the display and the second area is adjacent to the fourth side of the display.

10. The electronic device of claim 1, further comprising a fingerprint recognition sensor between the first plate and the second plate, wherein the fingerprint recognition sensor is located within the second area of the touch screen display.

11. The electronic device of claim 10, wherein the instructions further cause the processor to at least temporarily display a graphic user interface (GUI) on the display, and wherein the GUI shows a location of the fingerprint recognition sensor.

12. The electronic device of claim 11, wherein the GUI is integrated with the function buttons.

13. The electronic device of claim 11, wherein the instructions further cause the processor to display the GUI in the second area of the touch screen display when the second aspect ratio is smaller than the first aspect ratio, and display the GUI on the touch screen display such that the GUI at least temporarily overlaps the user interface when the second aspect ratio is substantially equal to the first aspect ratio.

14. The electronic device of claim 1, wherein the second aspect ratio is 16:9.

15. A non-transitory computer-readable recording medium having a program recorded thereon, to be executed on a computer, the program, when executed by a processor, causing the processor to:
execute, by the processor, an application, from among at least one application, selected from a home screen;
compare a second aspect ratio of a user interface of the application with a first aspect ratio of a touch screen display,
when the second aspect ratio is smaller than the first aspect ratio, display the user interface in a first area of the touch screen display having a ratio substantially equal to the second aspect ratio, and display function buttons that are for navigating to other applications and are not a part of the application, in a second area of the touch screen display that does not overlap the first area,
when the second aspect ratio is substantially equal to the first aspect ratio, display the user interface in substantially an entire area of the touch screen display, and display the function buttons in the second area of the touch screen display, such that the function buttons at least temporarily overlap the user interface,
wherein the function buttons include a first function button and a second function button, and
wherein the first function button and the second function button are displayed in the second area based on a size of the second area being greater than or equal to a first size, and a third function button, having a first function of the first function button and a second function of the second function button, is displayed in the second area based on the size of the second area being smaller than the first size.

16. The non-transitory computer-readable recording medium of claim 15, wherein the processor receives a biometric information authentication request related to the application and displays a location of a fingerprint recognition sensor in the second area of the touch screen display through a graphic user interface.

17. The non-transitory computer-readable recording medium of claim 15, wherein the processor receives a first input related to the application through the touch screen display, identifies content requiring biometric information authentication to display at least one piece of content associated with the application in response to the first input, and displays a preset graphic object in the identified content.

18. The non-transitory computer-readable recording medium of claim 17, wherein the processor receives a fingerprint information input through the touch screen display and displays the content on the touch screen display in response to the received fingerprint information input.

19. An electronic device comprising:
a touch screen display having a first aspect ratio;
a memory that stores at least one application; and
a processor electrically connected to the touch screen display and the memory,
wherein the processor is configured to:
execute an application, from among of the at least one application, selected from a home screen;
compare a second aspect ratio of a user interface of the application with the first aspect ratio,
when the second aspect ratio is smaller than the first aspect ratio, display the user interface in a first area having the second aspect ratio of the touch screen display, and display function buttons that are for navigating to other applications and are not a part of the application, in a second area of the touch screen display that does not overlap the first area, and
when the second aspect ratio is equal to the first aspect ratio, display the user interface over an entire area of the touch screen display, and display the function buttons in the second area of the touch screen display, such that the function buttons overlap the user interface,
wherein the function buttons include a first function button and a second function button, and
wherein the first function button and the second function button are displayed in the second area based on a size of the second area being greater than or equal to a first size, and a third function button, having a first function of the first function button and a second function of the second function button, is displayed in the second area based on the size of the second area being smaller than the first size.

20. The electronic device of claim 19, wherein the touch screen display includes a first side extending in a first direction and having a first length X, a second side extending in a second direction perpendicular to the first direction and having a second length Y shorter than the first length, a third side having the first length and parallel to the first side, and a fourth side having the second length and parallel to the second side, and wherein the first aspect ratio is X:Y, which is larger than 16:9.

* * * * *